US010511655B2

(12) United States Patent
Bae et al.

(10) Patent No.: US 10,511,655 B2
(45) Date of Patent: Dec. 17, 2019

(54) APPARATUS AND METHOD FOR REDUCING POWER CONSUMPTION IN ELECTRONIC DEVICE

(71) Applicant: Samsung Electronics Co., Ltd., Suwon-si, Gyeonggi-do (KR)

(72) Inventors: Tae-Jeong Bae, Suwon-si (KR); Chin-Kyu Kang, Hwaseong-si (KR); Hye-Jeong Kim, Suwon-si (KR); Sang-Soo Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/720,392

(22) Filed: Sep. 29, 2017

(65) Prior Publication Data

US 2018/0027052 A1    Jan. 25, 2018

Related U.S. Application Data

(63) Continuation of application No. 13/912,750, filed on Jun. 7, 2013, now Pat. No. 9,787,758.

(30) Foreign Application Priority Data

Jun. 7, 2012    (KR) .................. 10-2012-0061194
Sep. 24, 2012   (KR) .................. 10-2012-0106162

(51) Int. Cl.
*H04L 29/08*      (2006.01)
*H04W 4/50*       (2018.01)
(Continued)

(52) U.S. Cl.
CPC .............. *H04L 67/10* (2013.01); *H04W 4/50* (2018.02); *H04W 52/028* (2013.01);
(Continued)

(58) Field of Classification Search
CPC ..................................................... H04L 67/10
(Continued)

(56) References Cited

U.S. PATENT DOCUMENTS 5,922,047 A    7/1999  Newlin et al.
6,731,609 B1   5/2004  Hirni et al.
(Continued)

FOREIGN PATENT DOCUMENTS

CN    102158937 A      8/2011
EP       1540923 A4 *  5/2009  ........... G06F 1/3203
(Continued)

OTHER PUBLICATIONS

Calhoun et al., "Diameter Base Protocol", RFC3588, 2003 (Year: 2003).*

(Continued)

*Primary Examiner* — Ondrej C Vostal
(74) *Attorney, Agent, or Firm* — Jefferson IP Law, LLP

(57) ABSTRACT

An apparatus and a method for reducing power consumption of an Application Processor (AP) in an electronic device are provided. The electronic device includes a first processor for supporting a first Internet Protocol (IP) Multimedia Subsystem (IMS) protocol stack, and a second processor for supporting a second IMS protocol stack. The first processor includes an AP for processing a multimedia service, and the second processor includes at least one of a Communication Processor (CP), a Modem Processor (MP), and a Baseband Processor (BP) for processing a communication service.

30 Claims, 25 Drawing Sheets

(51) Int. Cl.
*H04W 52/02* (2009.01)
*H04W 80/08* (2009.01)

(52) U.S. Cl.
CPC ............ *H04W 80/08* (2013.01); *Y02D 70/00* (2018.01); *Y02D 70/1222* (2018.01); *Y02D 70/1262* (2018.01); *Y02D 70/142* (2018.01); *Y02D 70/144* (2018.01); *Y02D 70/166* (2018.01); *Y02D 70/23* (2018.01); *Y02D 70/26* (2018.01)

(58) Field of Classification Search
USPC ....................................................... 709/201
See application file for complete search history.

(56) References Cited

U.S. PATENT DOCUMENTS

| | | | |
|---|---|---|---|
| 6,775,273 B1 | 8/2004 | Kung et al. | |
| 6,937,713 B1 | 8/2005 | Kung et al. | |
| 7,450,963 B2* | 11/2008 | Krishnan | G06F 1/3203 455/557 |
| 7,599,478 B2 | 10/2009 | Cai et al. | |
| 7,710,964 B2 | 5/2010 | Patil et al. | |
| 7,961,756 B1* | 6/2011 | Lambert | G06F 1/3215 370/469 |
| 8,027,335 B2 | 9/2011 | Ansari et al. | |
| 8,301,189 B1 | 10/2012 | Subramanian et al. | |
| 8,315,238 B2* | 11/2012 | Taleb | H04L 49/552 370/338 |
| 8,335,499 B1 | 12/2012 | Zhao et al. | |
| 8,365,215 B2 | 1/2013 | Hicks, III et al. | |
| 8,516,529 B2 | 8/2013 | Lajoie et al. | |
| 8,730,294 B2 | 5/2014 | Benzaia et al. | |
| 8,934,389 B2* | 1/2015 | Kuehnel | H04W 52/0274 370/311 |
| 2004/0204050 A1* | 10/2004 | Krishnan | G06F 1/3203 455/556.1 |
| 2005/0213732 A1 | 9/2005 | Rodman | |
| 2005/0213739 A1 | 9/2005 | Rodman et al. | |
| 2006/0293100 A1 | 12/2006 | Walter | |
| 2007/0083524 A1* | 4/2007 | Fung | H04L 12/66 |
| 2007/0093264 A1 | 4/2007 | Srinivasan et al. | |
| 2007/0132733 A1 | 6/2007 | Ram | |
| 2007/0297005 A1 | 12/2007 | Montierth et al. | |
| 2008/0102832 A1 | 5/2008 | Sengupta et al. | |
| 2008/0117859 A1* | 5/2008 | Shahidi | H04W 48/18 370/328 |
| 2008/0134052 A1 | 6/2008 | Davis et al. | |
| 2008/0186929 A1 | 8/2008 | Rice et al. | |
| 2009/0041225 A1 | 2/2009 | Agarwal et al. | |
| 2009/0049220 A1* | 2/2009 | Conti | G06F 13/24 710/267 |
| 2009/0059899 A1 | 3/2009 | Bendelac | |
| 2009/0061825 A1* | 3/2009 | Neelakantan | H04L 29/12292 455/412.1 |
| 2009/0080638 A1 | 3/2009 | Cleveland et al. | |
| 2009/0157936 A1 | 6/2009 | Goss et al. | |
| 2009/0161629 A1* | 6/2009 | Purkayastha | H04W 36/0011 370/331 |
| 2009/0164655 A1 | 6/2009 | Pettersson et al. | |
| 2009/0170512 A1 | 7/2009 | Regnier et al. | |
| 2009/0181665 A1* | 7/2009 | Sater | H04L 41/5009 455/424 |
| 2009/0303964 A1* | 12/2009 | Lamer | H04L 29/06027 370/331 |
| 2010/0061316 A1 | 3/2010 | Levenshteyn et al. | |
| 2010/0118845 A1 | 5/2010 | Solver | |
| 2010/0199341 A1 | 8/2010 | Foti et al. | |
| 2010/0208668 A1 | 8/2010 | Dumazy | |
| 2010/0299451 A1* | 11/2010 | Yigang | H04L 45/306 709/241 |
| 2010/0309847 A1* | 12/2010 | Bharadwaj | H04W 48/18 370/328 |
| 2010/0332614 A1* | 12/2010 | Holm | H04L 65/1063 709/217 |
| 2011/0069635 A1* | 3/2011 | Low | H04W 28/24 370/254 |
| 2011/0069720 A1 | 3/2011 | Jacobs et al. | |
| 2011/0176512 A1 | 7/2011 | Sun | |
| 2011/0194474 A1 | 8/2011 | Kim et al. | |
| 2011/0208824 A1* | 8/2011 | Lidstrom | H04W 48/18 709/206 |
| 2011/0265116 A1 | 10/2011 | Stren et al. | |
| 2011/0299471 A1 | 12/2011 | Wang | |
| 2012/0014273 A1 | 1/2012 | Notton et al. | |
| 2012/0033610 A1 | 2/2012 | Ring et al. | |
| 2012/0072601 A1* | 3/2012 | Bharadwaj | H04L 65/1016 709/228 |
| 2012/0082158 A1 | 4/2012 | Reddy et al. | |
| 2012/0166531 A1 | 6/2012 | Sylvain | |
| 2012/0221739 A1 | 8/2012 | Schroeder, Jr. et al. | |
| 2012/0271958 A1* | 10/2012 | Oh | H04L 12/14 709/228 |
| 2012/0275323 A1 | 11/2012 | Reznik et al. | |
| 2013/0016668 A1* | 1/2013 | Zhao | H04L 61/2517 370/329 |
| 2013/0169753 A1 | 7/2013 | Lee et al. | |
| 2013/0208628 A1 | 8/2013 | Balasubramanian | |
| 2013/0326214 A1* | 12/2013 | McCanna | H04L 9/3268 713/156 |

FOREIGN PATENT DOCUMENTS

| | | | | |
|---|---|---|---|---|
| EP | 2 355 596 A1 | 10/2011 | | |
| EP | 2355596 B1 * | 1/2018 | ........ | H04W 52/0229 |
| JP | 2008-532191 A | 8/2008 | | |
| KR | 10-1050283 B1 | 7/2011 | | |
| KR | 10-1116802 B1 | 10/2011 | | |
| KR | 10-2012-0002621 | 1/2012 | | |
| WO | 2004021684 A1 | 3/2004 | | |
| WO | WO-2004021684 A1 * | 3/2004 | ........... | G06F 1/3203 |

OTHER PUBLICATIONS

WhatIs.com, "Definition TCP/IP (Transmission Control Protocol/Internet Protocol", 2019 (Year: 2019).*
Wikipedia, "IP Multimedia Subsystem", 2019 (Year: 2019).*
Merriam-Webster, "economic", 2016.
Fabini et al., "'IMS in a Bottle': Initial Experiences from an OpenSER-based Prototype Implementation of the 3GPP IP Multimedia Subsystem", 2006.
Falchuk et al., "Mobile Contextual Mashup Service for IMS", 2008.
Huang et al., "SIP mobility and 1Pv4/1Pv6 dual-stack supports in 3G IP multimedia subsystem", 2006.
Kan et al., "Experiences with Blending HTTP, RTSP, and IMS", 2007.
Merriam-Webster, "processor", 2014.
Crocker, "Standard for the format of ARPA Internet Text Messages", RFC 0822, 1982.
Chiba et al., "Performance Analysis of Next Generation Mobility Protocols for IMS/MM D Networks", 2008.
Pandey et al., "Performance Study of IMS Signaling Plane", 2007.
Skorin-Kapov et al., "Application-Level QoS Negotiation and Signaling for Advanced Multimedia Services in the IMS", 2007.
GSMA, "IMS Profile for Voice and SMS", version 7.0, 2013.
Postel, "Internet Protocol DARPA Internet Program Protocol Specification", RFC 0791, 1981.
Wiljakka, "Analysis on 1Pv6 Transition in Third Generation Partnership Project (3GPP) Networks", RFC 4215, 2005.
Rosenberg et al., "Indicating User Agent Capabilities in the Session Initiation Protocol (SIP)", RFC 3840, 2004.
Holtman et al., "Media Feature Tag Registration Procedure", RFC 2506, 1999.
Li et al., "Design and Implementation of the Mobile IPTV Service Based on the IMS Intelligent Terminal", 2011.
LinuxDevices staff, "IMS stack adds standards compliance", 2008.
Chakravarthy, "IP Multimedai Subsystem : A Tutorial", 2006.

(56) References Cited

OTHER PUBLICATIONS

Waiting et al., "Open Source Development Tools for IMS Reasearch (Invited Paper)", 2008.
Korean Office Action dated Dec. 20, 2018, issued in Korean Patent Application No. 10-2012-0106162.
Indian Office Action dated Mar. 18, 2019; Indian Appln. No. 2453/CHE/2013.
Korean Notice of Patent Grant office action dated Jun. 18, 2019.

\* cited by examiner

APPARATUS AND METHOD FOR REDUCING POWER CONSUMPTION IN ELECTRONIC DEVICE

CROSS-REFERENCE TO RELATED APPLICATION(S)

This application is a continuation application of prior U.S. application Ser. No. 13/912,750, filed on Jun. 7, 2013, and claimed the benefit under 35 U.S.C. § 119(a) of a Korean patent applications filed in the Korean Intellectual Property Office on Jun. 7, 2012 and Sep. 24, 2012 and assigned Serial Nos. 10-2012-0061194 and 10-2012-0106162, the entire disclosures of which are hereby incorporated by reference.

BACKGROUND OF THE INVENTION

1. Field of the Invention

The present invention relates generally to an electronic device. More particularly, the present invention relates to an apparatus and a method for reducing power consumption in an electronic device.

2. Description of the Related Art

Based on development of communication technologies, a portable electronic device is evolving into a multimedia device for providing not only a voice call service but also various multimedia services using a data communication service. In order to provide the voice call service and the various multimedia services, the portable electronic device according to the related art may include a Modem Processor (MP) for data communication, and an Application Processor (AP) for driving an application and for processing a User Interface (UI).

Unlike a stationary electronic device which is operatively connected to a continuous power supply, the portable electronic device uses a battery as a power source for the sake of portability. The battery capacity limits an operation time of the portable electronic device. Hence, the portable electronic device requires a method for extending its operation time using the limited power.

As discussed above, the portable electronic device uses the AP to provide diverse multimedia services. In so doing, as the AP increases the power consumption, the operation time of the portable electronic device is shortened.

Therefore, a need exists for a method for reducing the power consumption while using the AP for the multimedia service in the portable electronic device.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an apparatus and a method for reducing power consumption in an electronic device.

Another aspect of the present invention is to provide an apparatus and a method for reducing power consumption of an application processor in an electronic device.

Another aspect of the present invention is to provide an apparatus and a method for supporting Internet Protocol (IP) Multimedia Subsystem (IMS) protocol in a modem processor of an electronic device.

Another aspect of the present invention is to provide an apparatus and a method for providing an IMS service in a modem processor of an electronic device.

Another aspect of the present invention is to provide an apparatus and a method for providing a voice service of a Packet Switching (PS) network in a modem processor of an electronic device.

In accordance with an aspect of the present invention, an electronic device is provided. The electronic device includes a first processor for supporting a first Internet Protocol (IP) Multimedia Subsystem (IMS) protocol stack; and a second processor for supporting a second IMS protocol stack. The first processor includes an Application Processor (AP) for processing a multimedia service, and the second processor includes at least one of a Communication Processor (CP), a Modem Processor (MP), and a Baseband Processor (BP) for processing a communication service.

In accordance with an aspect of the present invention, the first processor and the second processor support the IMS protocol stack including a plurality of IMS protocols to equally provide an IMS service.

In accordance with an aspect of the present invention, the first processor supports the first IMS protocol stack including a plurality of IMS protocols to provide an IMS service, and the second processor supports the second IMS protocol stack including at least one of the IMS protocols of the first IMS protocol stack, and Transmission Control Protocol/IP (TCP/IP). The second IMS protocol stack includes at least one of Session Initiation Protocol (SIP), Real-time Transfer Protocol (RTP), and Real time Control Protocol (RTCP).

In accordance with an aspect of the present invention, the first processor supports the first IMS protocol stack including at least one IMS protocol to provide the IMS service, and the second processor includes the second IMS protocol stack which includes at least one IMS protocol different from at least one IMS protocol of the first IMS protocol stack.

In accordance with an aspect of the present invention, a method for providing an IMS service in an electronic device including a first processor for supporting a first IMS protocol stack and a second processor for supporting a second IMS protocol stack is provided. The method includes determining whether to provide a communication service; and when determining to provide the communication service, providing at least one IMS service using the second processor. The first processor includes an AP for processing a multimedia service, and the second processor includes at least one of a CP, an MP, and a BP for processing a communication service.

In accordance with an aspect of the present invention, the first processor comprises at least one of a video engine and an audio engine, the second processor comprises at least one of a video engine and an audio engine, the video engine processes video data provided from the IMS protocol stack, outputs the processed video data, and sends received video data to the IMS protocol stack, and the audio engine processes audio data provided from the IMS protocol stack, outputs the processed audio data, and sends received audio data to the IMS protocol stack.

In accordance with an aspect of the present invention, the first processor and the second processor support the IMS protocol stack comprising a plurality of IMS protocols to equally provide the IMS service.

In accordance with an aspect of the present invention, the providing of the IMS service comprises: if the second processor comprises a video engine and an audio engine, providing the IMS service using the plurality of the IMS protocols, wherein the video engine processes video data provided from the IMS protocol stack, outputs the processed video data, and sends received video data to the IMS protocol stack, the audio engine processes audio data provided from the IMS protocol stack, outputs the processed audio data, and sends received audio data to the IMS protocol stack, and when the second processor provides the IMS service, the first processor is temporarily turned off.

In accordance with an aspect of the present invention, the first processor supports the first IMS protocol stack including a plurality of IMS protocols to provide an IMS service, and the second processor supports the second IMS protocol stack including at least one of the IMS protocols of the first IMS protocol stack. The second IMS protocol stack includes at least one of an SIP, an RTP, and an RTCP.

In accordance with an aspect of the present invention, the providing of the IMS service comprises: if the second processor comprises a video engine and an audio engine, providing a voice call service or a video call service over a Packet Switching (PS) network using the at least one IMS protocol, wherein the video engine processes video data provided from the IMS protocol stack, outputs the processed video data, and sends received video data to the IMS protocol stack, the audio engine processes audio data provided from the IMS protocol stack, outputs the processed audio data, and sends received audio data to the IMS protocol stack, and when the second processor provides the voice call service or the video call service, the first processor is temporarily turned off.

In accordance with an aspect of the present invention, the providing of the IMS service comprises: if the second processor comprises an audio engine, providing a voice call service over a Packet Switching (PS) network using the at least one IMS protocol stack, wherein the audio engine processes audio data provided from the IMS protocol stack, outputs the processed audio data, and sends received audio data to the IMS protocol stack, and when the second processor provides the voice call service, the first processor is temporarily turned off.

In accordance with an aspect of the present invention, further comprising: when providing the voice call service, performing session refresh using a Session Initiation Protocol (SIP) of the second processor.

In accordance with an aspect of the present invention, the providing of the IMS service comprises: providing, by the first processor, a video call service over the PS network using the plurality of the IMS protocols.

In accordance with an aspect of the present invention, further comprising: before the providing of the video call service in the first processor, determining a type of data received from a physical layer in a data router of the second processor; and when the data comprises at least one of video data and audio data for the video call service, outputting, at the data router, the data to a Transmission Control Protocol/IP (TCP/IP) of the first processor.

In accordance with an aspect of the present invention, further comprising: if the data comprises the audio data for the voice call service, outputting, at the data router, the data to a TCP/IP of the second processor, wherein the providing of the voice call service comprises: providing, at the second processor, the voice call service over the PS network using the audio data received from the data router through the TCP/IP.

In accordance with an aspect of the present invention, the data router determines the data type based on a type of a Packet Data Network (PDN) and a bearer.

In accordance with an aspect of the present invention, the data router determines the data type by analyzing a header of an IP packet.

In accordance with an aspect of the present invention, the first processor supports the first IMS protocol stack comprising at least one IMS protocol to provide the IMS service, and the second processor comprises the second IMS protocol stack which comprises at least one IMS protocol different from at least one IMS protocol of the first IMS protocol stack.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the exemplary embodiments described herein can be made without departing from the scope and spirit of the present invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention provide a technique for reducing power consumption of an Application Processor (AP) in an electronic device. The AP may drive an application using data and may process a User Interface (UI).

Hereinafter, the electronic device can employ devices including the AP and a Modem Processor (MP). For example, the electronic device may correspond to a portable electronic device, a portable terminal, a mobile terminal, a mobile pad, a media player, a Personal Digital Assistant (PDA), a desktop computer, a laptop computer, a smart phone, a netbook, a television, a Mobile Internet Device (MID), an Ultra Mobile Personal Computer (UMPC), a tablet PC, a navigation system, a smart TV, a wrist watch, a digital camera, an MP3 player, a handheld e-book, a portable gaming console, a portable media player, and the like. The MP for processing a communication modem function may be referred to as a Communication Processor (CP) or a Baseband Processor (BP).

Figure 1:
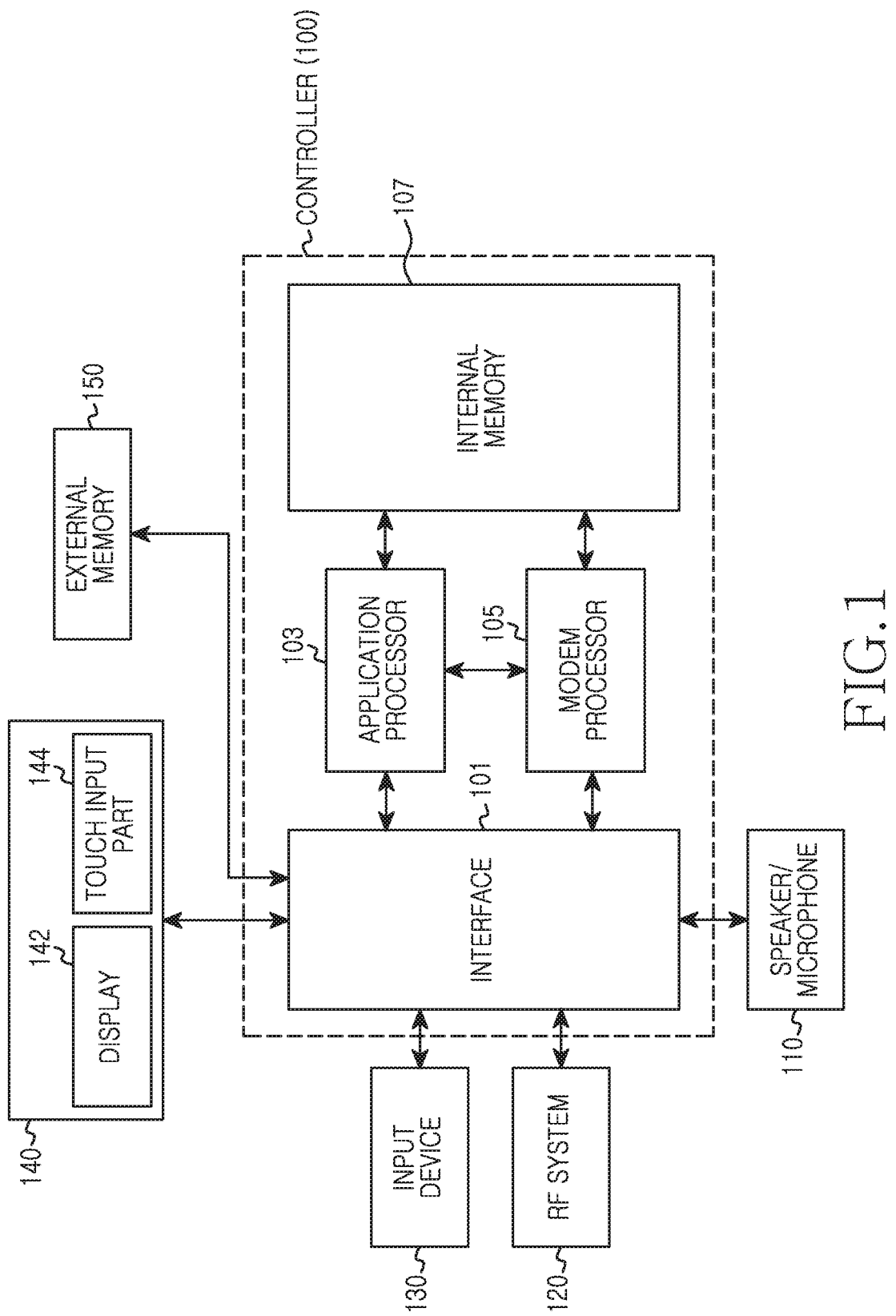
FIG. 1 is a block diagram of an electronic device according to an exemplary embodiment of the present invention.

FIG. 1 is a block diagram of an electronic device according to an exemplary embodiment of the present invention.

Referring to FIG. 1, the electronic device is assumed to include a touch screen.

As illustrated in FIG. 1, the electronic device can include a controller 100, a speaker/microphone 110, a Radio Frequency (RF) communication system 120, an input device 130, a touch screen 140, and an external memory 150. According to exemplary embodiments of the present invention, the electronic device may include a plurality of external memories 150.

The controller 100 can include an interface 101, an AP 103, an MP 105, and an internal memory 107. The interface 101, the AP 103, the MP 105, and the internal memory 107 of the controller 100 may be integrated onto at least one integrated circuit or embodied separately. According to exemplary embodiments of the present invention, the controller may include a plurality of APs 103, a plurality of MPs 105, and/or a plurality of internal memories 107.

The AP 103 controls to provide a multimedia service and the UI using at least one software program. The AP 103 can provide the multimedia service by processing data transmitted and received over a Packet Switching (PS) network using an Internet Protocol (IP) Multimedia Subsystem (IMS) protocol stored in at least one of the internal memory 107 and the external memory 150. When the MP 105 supports the IMS protocol, the AP 103 may provide an IMS service in association with the MP 105 supporting the IMS protocol.

The MP 105 processes voice signals and data transmitted and received over a communication network. The MP 105 can include a communication protocol and a codec. In addition, the MP 105 may control to provide the IMS service using at least one IMS protocol stored in at least one of the internal memory 107 and the external memory 150. For example, the MP 105 can support at least one protocol defined in IMS standard, such as Session Initiation Protocol (SIP), Session Description Protocol (SDP), Real-time Transfer Protocol (RTP), Real time Control Protocol (RTCP), Message Session Relay Protocol (MSRP), Hyper Text Transfer Protocol (HTTP), Real Time Streaming Protocol (RTSP), Transmission Control Protocol/IP (TCP/IP), and the like. In so doing, the MP 105 may support the same IMS protocol as the AP 103 or only some protocols required for the IMS service.

Figure 2:
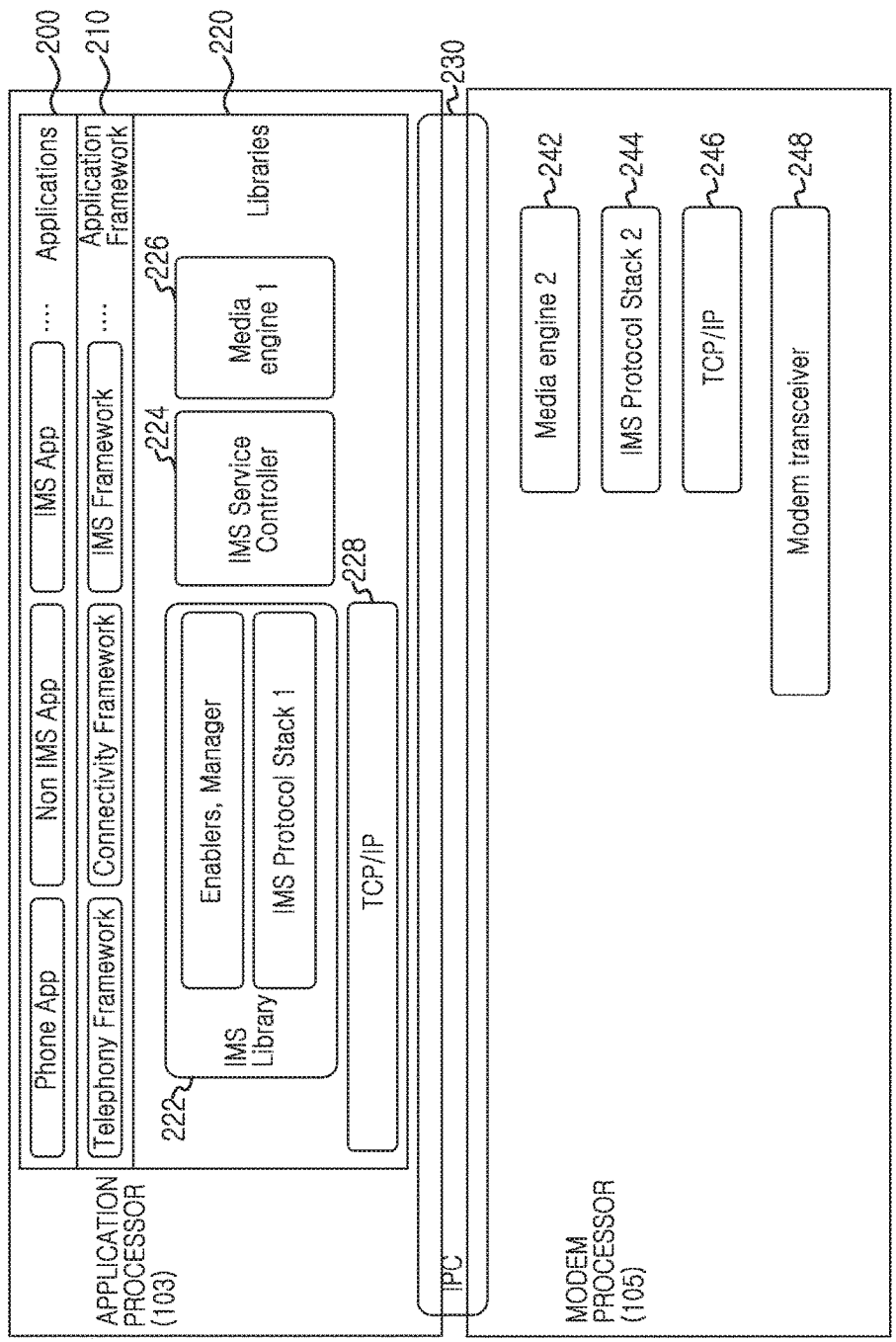
FIG. 2 is a detailed block diagram of an Application Processor (AP) and a Modem Processor (MP) according to an exemplary embodiment of the present invention.

The interface 101 interconnects an input/output peripheral of the electronic device with the AP 103 and the MP 105. In addition, the AP 103 and the MP 105 can communicate with each other using Inter Processor Communication (IPC) 230 as illustrated in FIG. 2.

The internal memory 107 and the external memory 150 store a program for controlling operations of the electronic device, data generated in the operations of the electronic device, and multimedia content. For example, the program can include an operating system program, a communication program, a graphic program, a UI program, the protocol, the codec, at least one application program, and the like. When at least one of the internal memory 107 and the external memory 150 stores the protocol, the memory can store the protocol by separating the protocol of the AP 103 and the protocol of the MP 105. A program may correspond to a set of instructions and accordingly, may be referred to as an instruction set.

The speaker/microphone 110 inputs and outputs an audio signal. The electronic device may input and output the audio signal using any one of an ear phone (not shown), a head phone (not shown), and a head set (not shown), connected through an external port.

The RF system 120 performs a communication function for voice communication and data communication. In so doing, the RF system 120 may include a plurality of submodules for wireless communication, such as an antenna, a transceiver, an RF module, and the like. The RF system 120 may be divided into a plurality of communication submodules for supporting different communication networks. For example, the communication network may include at least one of, but not limited to, a Global System for Mobile communication (GSM) network, an Enhanced Data GSM Environment (EDGE) network, a Code Division Multiple Access (CDMA) network, a W-CDMA network, a Long Term Evolution (LTE) network, an Orthogonal Frequency Division Multiple Access (OFDMA) network, a wireless Local Area Network (LAN), a Bluetooth network, Near Field Communication (NFC), and the like.

The input device 130 provides input data generated by a user's selection to the controller 100. For example, the input device 130 may include only a control button for controlling the electronic device. As another example, the input device 130 may include a keypad for receiving the input data from the user.

The touch screen 140 is an input/output device for outputting and inputting information, and can include a display 142 and a touch input part 144.

The display 142 displays status information of the electronic device, a character input by the user, a moving picture, and a still picture.

The touch input part 144 provides touch information detected through a touch panel to the controller 100. In so doing, the touch input part 144 provides the controller 100 with touch information of a touch pen or a finger.

According to exemplary embodiments of the present invention, the internal memory 107 may be separated from the AP 103 and the MP 105.

Alternatively, the AP 103 and the MP 105 may respectively include the internal memory 107 therein. In this case, the AP 103 and the MP 105 can provide the IMS service using the at least one IMS protocol and the TCP/IP stored in their respective internal memory.

FIG. 2 is a detailed block diagram of an AP and an MP according to an exemplary embodiment of the present invention.

Referring to FIG. 2, the AP 103 and the MP 105 are assumed to provide the IMS service using the at least one IMS protocol and the TCP/IP stored in their respective internal memory.

As illustrated in FIG. 2, the AP 103 controls to provide the multimedia service using at least one software program. For example, the AP 103 includes an application layer 200, a framework layer 210, and a library layer 220. The AP 103 can further include various components in addition to these components.

The application layer 200 drives the application program. For example, the application layer 200 drives an IMS application, a non IMS application, and a phone application executable in the electronic device.

The framework layer 210 interconnects the application layer 200 and the library layer 220.

The library layer 220 includes necessary modules for providing the IMS service, such as an IMS library 222, an IMS service controller 224, a first media engine 226, and a TCP/IP 228. The library layer 220 can further include various components in addition to these components.

The IMS library 222 includes a first IMS protocol stack, and a device and software for driving the IMS application. For example, the first IMS protocol stack can include the protocols defined in the IMS standard, such as, for example, SIP, SDP, RTP, RTCP, RTSP, MSRP, HTTP, and the like.

The IMS service controller 224 determines whether to use, for the IMS service, the first IMS protocol stack of the AP 103 and the first media engine 226 of the AP 103, and a second IMS protocol stack 244 and a second media engine 242 of the MP 105. For example, to provide the IMS service, the IMS service controller 224 controls to the first IMS protocol stack of the AP 103 to act as a master and to interact with the application. To provide the IMS service, the IMS service controller 224 controls to drive the second IMS protocol stack 244 and the second media engine 242 of the MP 103.

The first media engine 226 includes the necessary device and software for processing video data and audio data. For example, the first media engine 226 includes at least one of a video engine including the necessary device and software for processing the video data, and an audio engine including the necessary device and software for processing the audio data.

The MP 105 includes a modem transceiver 248 for processing communication with an external base station. For example, the modem transceiver 248 can include a plurality of submodules including an interface with the RF system, a physical layer, and a modem protocol stack. In so doing, the modem transceiver 248 may be divided into a plurality of communication submodules for supporting different communication networks. For example, the communication network includes at least one of, but not limited to, the GSM network, the EDGE network, the CDMA network, the W-CDMA network, the LTE network, the OFDMA network, the wireless LAN, the Bluetooth network, the NFC, and the like.

In addition, the MP 105 includes the second media engine 242, the second IMS protocol stack 244, and the TCP/IP 246, for processing the IMS data for the sake of the IMS service. The MP 105 may further include various components besides these components.

Figure 12:
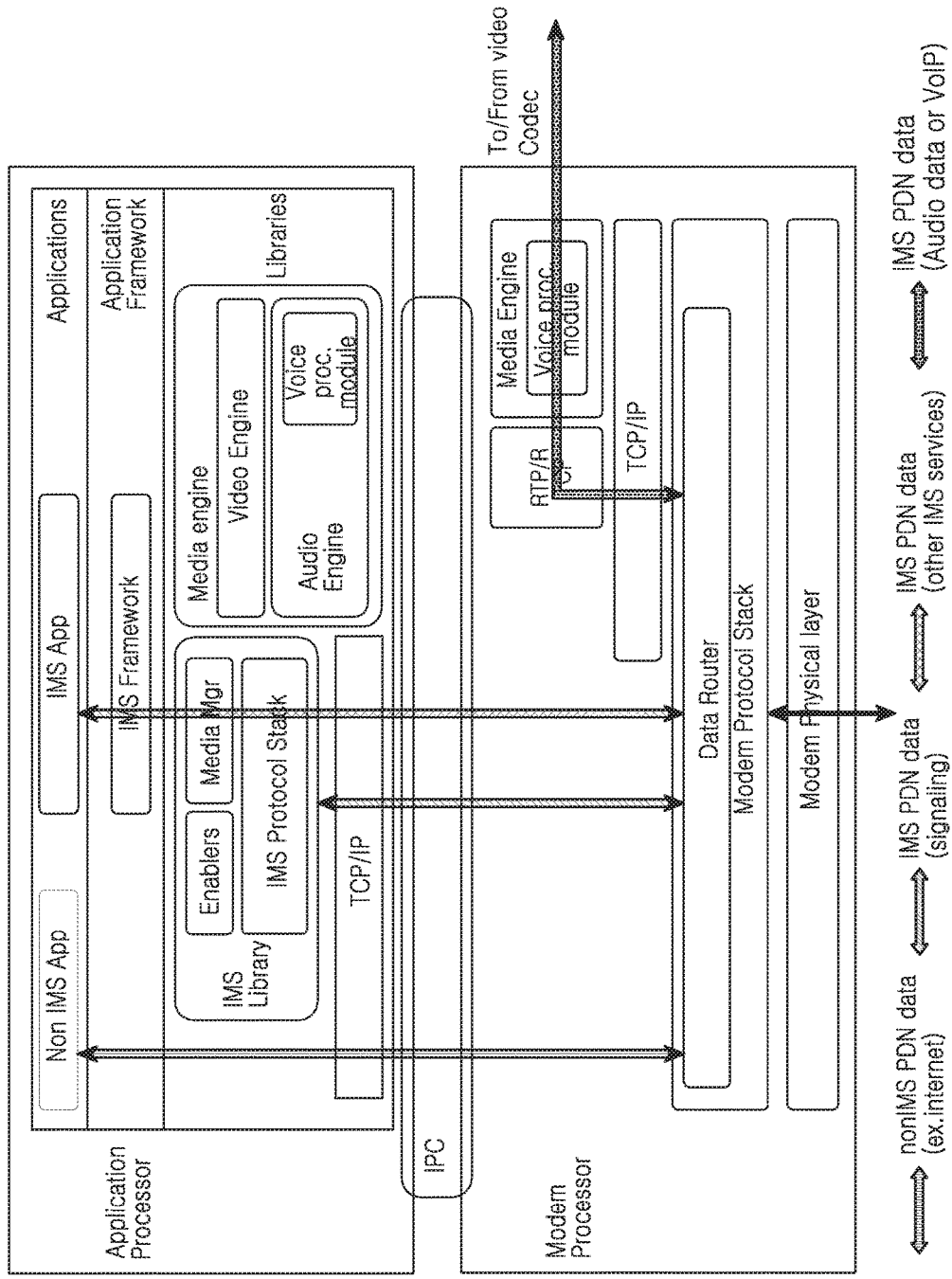
FIG. 12 is a data flow diagram for providing a voice service in an MP of an electronic device according to an exemplary embodiment of the present invention.
Figure 13:
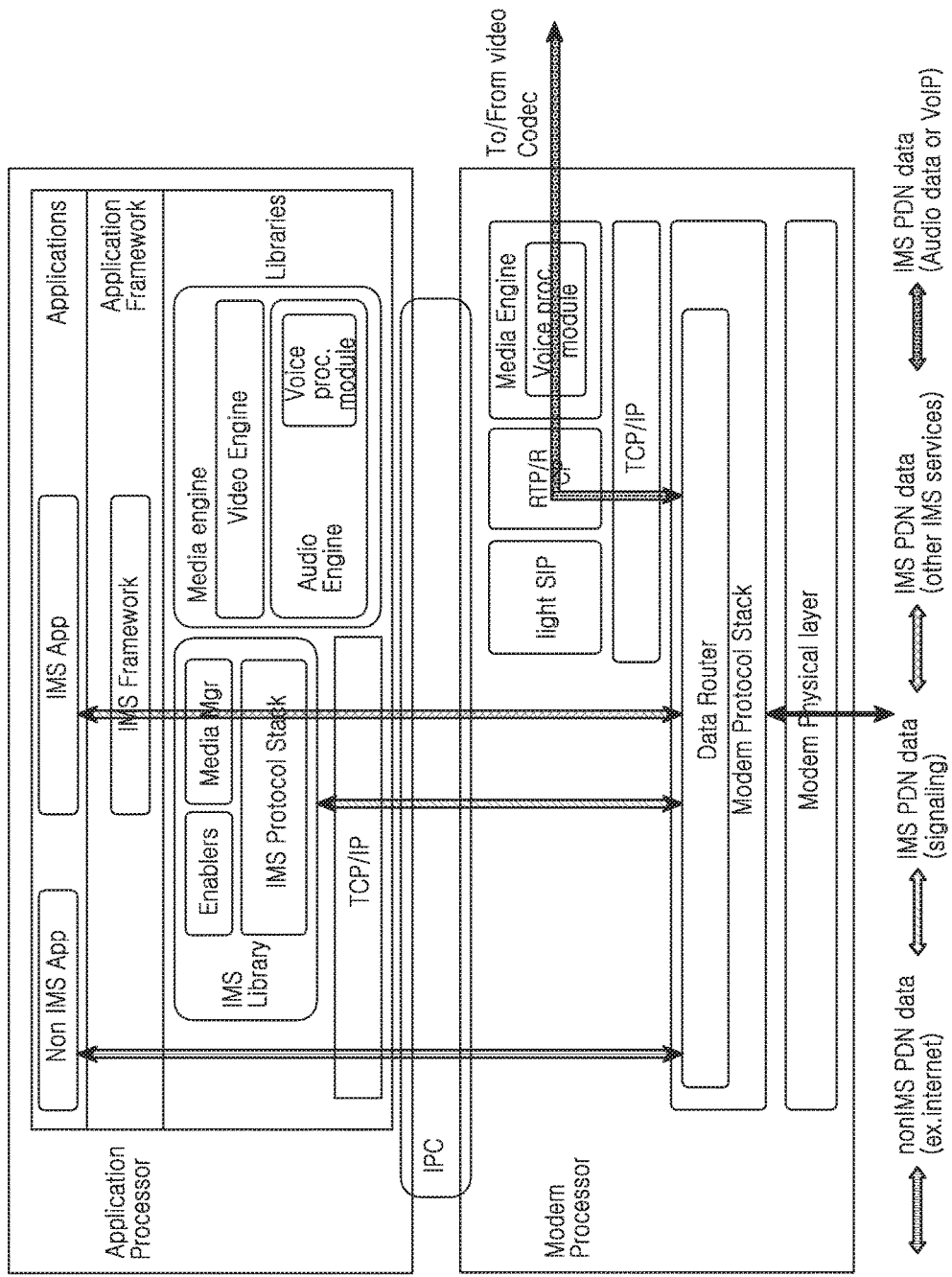
FIG. 13 is a data flow diagram for providing a voice service in an MP of an electronic device according to an exemplary embodiment of the present invention.

As described above, the AP 103 can include the first IMP protocol stack for processing the IMS data, and the MP 105 can include the second IMP protocol stack 244 for processing the IMS data. The first IMP protocol stack and the second IMP protocol stack 244 equally include every IMS protocol required for the IMS service. Alternatively, the second IMP protocol stack 244 can be a subset of the first IMP protocol stack. For example, the first IMP protocol stack can include every IMS protocol required for the IMS service, and the second IMP protocol stack 244 can include some of the IMS protocols required for the IMS service. More specifically, the second IMP protocol stack 244 can include the RTP/RTCP protocol as shown in FIG. 12, or some functions of the RTP/RTCP protocol and the SIP protocol as shown in FIG. 13. For example, the first IMP protocol stack and the second IMP protocol stack 244 may include different IMS protocols.

The AP 103 can include the first media engine 226 for processing the IMS data, and the MP 105 can include the second media engine 242 for processing the IMS data. The first media engine 226 and the second media engine 242 can equally include the video engine and the audio engine. For example, the first media engine 226 can include the video engine and the audio engine, and the second media engine 242 can include the audio engine. For example, the first media engine 226 may include the video engine, and the second media engine 242 may include the audio engine.

Figure 3:
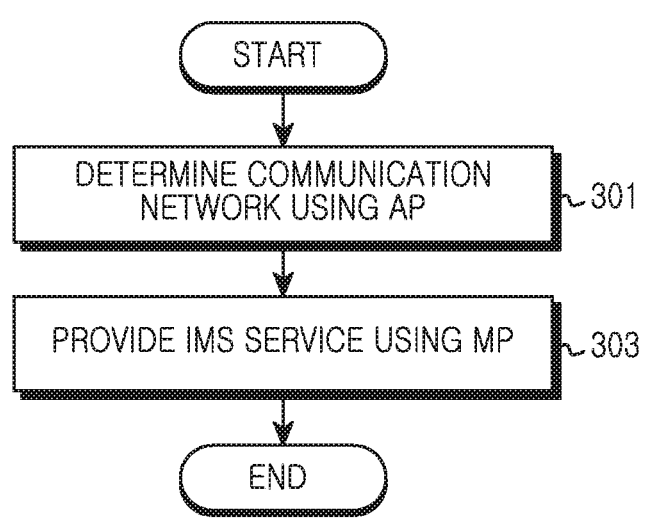
FIG. 3 is a flowchart of a method for providing an Internet Protocol (IP) Multimedia Subsystem (IMS) service in an MP according to an exemplary embodiment of the present invention.

When the first IMP protocol stack and the second IMP protocol stack 244 equally include all of the IMS protocols required for the IMS service and the video engine and the audio engine are included, the electronic device can provide the IMS service using the MP as shown in FIG. 3.

FIG. 3 is a flowchart of a method for providing an IMS service in an MP according to an exemplary embodiment of the present invention.

Referring to FIG. 3, in step 301, the electronic device determines whether to provide the communication service over the network using the AP. For example, the electronic device determines whether the electronic device can provide the communication service over the LTE network.

If the electronic device determines to provide the communication service in step 301, then the electronic device proceeds to step 303 in which the electronic device provides the IMS service using the MP. For example, to provide the communication service over the LTE network, the IMS service controller 224 of the AP 103 of FIG. 2 drives the second media engine 242, the second IMS protocol stack 244, and the TCP/IP 246 of the MP 105. Thereafter, the MP 105 provides the IMS service using the second media engine 242, the second IMS protocol stack 244, and the TCP/IP 246. In so doing, the electronic device can reduce the power consumption by turning off the AP.

Thereafter, the electronic device finishes the process of providing the IMS service.

Figure 4:
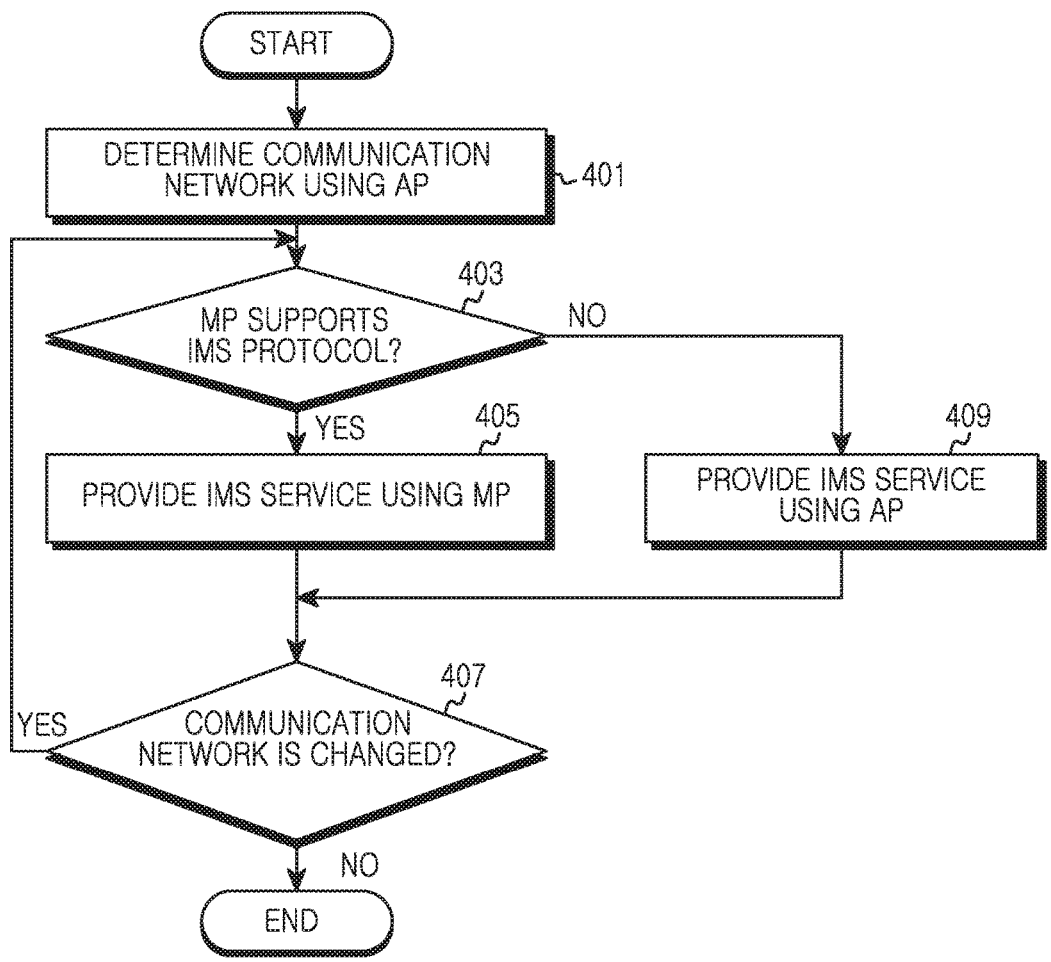
FIG. 4 is a flowchart of a method for providing an IMS service in an MP according to an exemplary embodiment of the present invention.

When the electronic device includes a plurality of MPs, the electronic device can provide the IMS service according to whether the MP supports the IMS protocol as shown in FIG. 4.

FIG. 4 is a flowchart of a method for providing an IMS service in an MP according to an exemplary embodiment of the present invention.

Referring to FIG. 4, in step 401, the electronic device determines the network for providing the communication service using the AP. For example, when the electronic device includes an LTE MP and an enhanced High-Rate Packet Data (eHRPD) MP, the electronic device determines whether the electronic device can provide the communication service over the LTE network according to priority. When not providing the communication service over the LTE network, the electronic device determines whether the electronic device can provide the communication service using the eHRPD.

In step 403, the electronic device determines whether the MP of the network for the communication service supports the IMS protocol.

If the electronic device determines that the MP of the network for the communication service supports the IMS protocol in step 403, then the electronic device proceeds to step 405 in which the electronic device provides the IMS service using the MP. For example, when providing the communication service over the LTE network, the IMS service controller 224 of the AP 103 of FIG. 2 drives the second media engine 242, the second IMS protocol stack 244, and the TCP/IP 246 of the MP 105. Thereafter, the MP 105 provides the IMS service using the second media engine 242, the second IMS protocol stack 244, and the TCP/IP 246. In so doing, the electronic device can reduce the power consumption by turning off the AP and the MP of the network which does not provide the communication service.

In contrast, if the electronic device determines that the MP of the network for the communication service does not support the IMS protocol in step 403, then the electronic device proceeds to step 409 in which the electronic device provides the IMS service using the AP. In so doing, the electronic device can reduce the power consumption by turning off the MP of the network which does not provide the communication service.

In step 407, the electronic device determines whether the communication network is changed. For example, the electronic device determines whether the electronic device hands over from the LTE network to the eHRPD network.

If the electronic device determines that the communication network is changed in step 407, then the electronic device returns to step 403 in which the electronic device determines whether the MP of the changed network supports the IMS protocol back.

In contrast, if the electronic device determines that the communication network is not changed in step 407, then the electronic device finishes this process. For example, as providing the communication service, the electronic device provides the IMS service using the MP or the AP.

As discussed above, when the handover takes place between the two MPs, the electronic device can offer the IMS service of the MP using the AP. In this case, the IMS protocol stack of the MP and the IMS protocol stack of the AP should be synchronized and linked. For example, when accessing the LTE network, the electronic device provides the IMS service using the LTE MP. When the electronic device hands over to the eHRPD network, the LTE MP sends necessary information for the IMS service, such as session information, to the IMS protocol stack of the AP. The AP can maintain the IMs service over the eHRPD network using the necessary information for the IMS service received from the LTE MP. In so doing, when not executing the communication protocol to check channel condition of the LTE network, the electronic device can reduce the power consumption by turning off the LTE MP.

Figure 5:
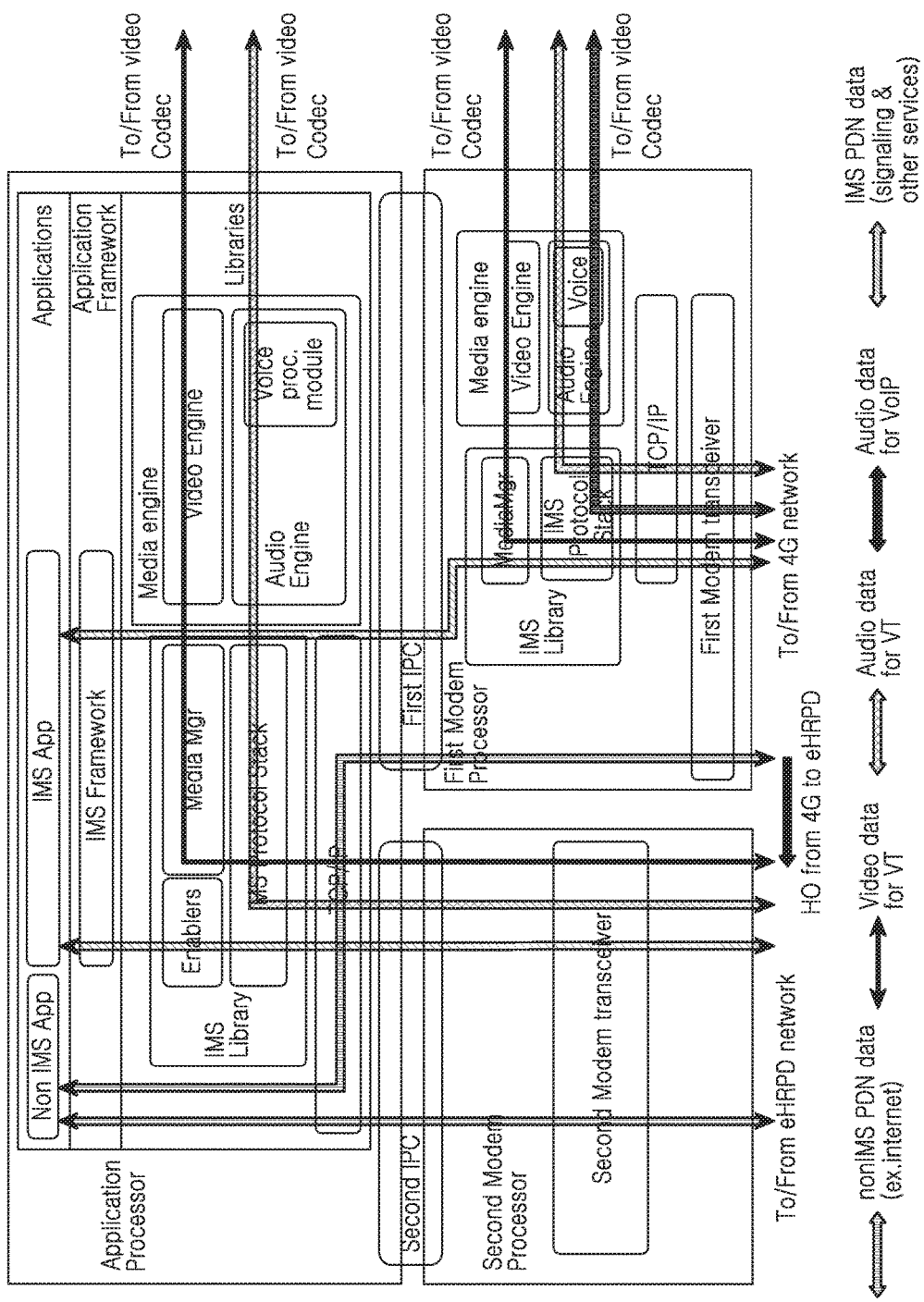
FIG. 5 is a data flow diagram for providing an IMS service in an MP of an electronic device according to an exemplary embodiment of the present invention.

FIG. 5 is a data flow diagram for providing an IMS service in an MP of an electronic device according to an exemplary embodiment of the present invention.

Referring to FIG. 5, a first MP includes the same IMS protocol as the AP, the video engine, and the audio engine, and a second MP does not support the IMS protocol.

When the electronic device includes a plurality of MPs, the AP can determine the communication network for providing the communication service.

When the communication service is provided using the first MP supporting the IMS protocol, the AP can drive the TCP/IP, the IMS library, and the media engine of the first MP.

The first MP can provide the IMS service using the TCP/IP, the IMS library, and the media engine. For example, to provide a voice call service, the first MP sets a call through SIP signaling. Next, the first MP processes the audio data for the voice call service and thus provides the voice call service over the PS network. In addition, the first MP performs periodic session refresh during the voice call service. In so doing, the AP and the second MP can be turned off to reduce the power consumption of the electronic device. The voice call service provided over the PS network includes a Voice over IP (VoIP) service.

For example, to provide the video call service, the first MP sets a call through SIP signaling. Next, the first MP processes the video data and the audio data for the video call service and thus provides the video call service over the PS network. In addition, the first MP performs the periodic session refresh during the video call service. In so doing, the AP and the second MP can be turned off to reduce the power consumption of the electronic device.

As such, when the first MP supports the IMS protocol, the first modem transceiver of the first MP includes a data router for classifying and routing data received from the physical layer, to an adequate path. For example, the data router classifies the data based on a type of a Packet Data Network (PDN) and a bearer. For example, the data router may classify the data by analyzing a header of an IP packet. The data is divided into IMS data and non IMS data, and the IMS data is divided into the signaling and the multimedia data. At this time, the data router can be embodied in the modem protocol stack of the first modem transceiver, or separately. For example, in an LTE system, the data router can be embodied in a Packet Data Convergence Protocol (PDCP) layer or above the PDCP separately.

Hence, when the first MP supports the IMS protocol, the data router can send the IMS data and the IMS signal to the TCP/IP of the first MP and send the non IMS data to the corresponding application through the TCP/IP of the AP.

When the communication service is provided using the second MP not supporting the IMS protocol, the AP can provide the IMS service. For example, in the voice call service, the AP can set the call through the SIP signaling. Next, the AP can process the audio data received through the second MP and thus offer the voice call service.

For example, for the video call service, the AP can set the call through the SIP signaling. Next, the AP can process the video data and the audio data received through the second MP and thus offer the video call service.

In the case of the handover from the first MP to the second MP, the first MP sends the necessary information for the IMS service, such as session information, to the IMS protocol stack of the AP in order to synchronize and link the IMS protocol stack of the AP. Thus, the AP can maintain the IMS service using the necessary information for the IMS service provided from the first MP.

Figure 6:
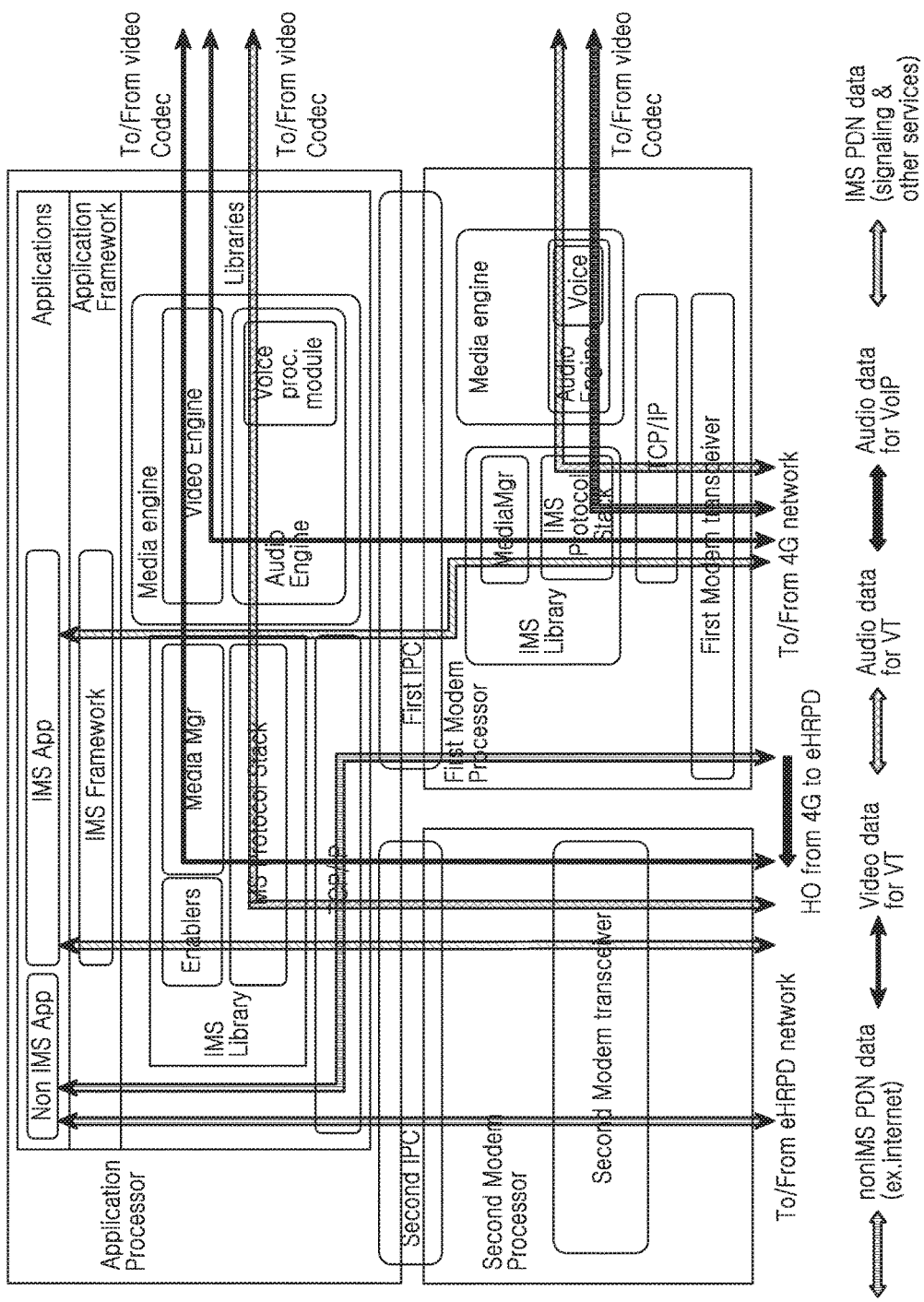
FIG. 6 is a data flow diagram for providing an IMS service in an MP of an electronic device according to an exemplary embodiment of the present invention.

FIG. 6 is a data flow diagram for providing an IMS service in an MP of an electronic device according to an exemplary embodiment of the present invention.

Referring to FIG. 6, for the voice call service, the first MP can process the audio data for the voice call service using the TCP/IP, the IMS library, and the media engine, and offer the voice call service over the PS network.

In the video call service, the audio data for the video call service can be processed by the TCP/IP, the IMS library, and the media engine of the first MP. The video data for the video call service can be processed by the TCP/IP and the IMS library of the first MP and the media engine of the AP.

As such, when the different processors process the video data and the audio data for the video call service, the AP and the first MP exchange information to synchronize the two data. For example, as sending the video data to the AP, the first MP also sends synchronization information for the audio data.

Figure 7:
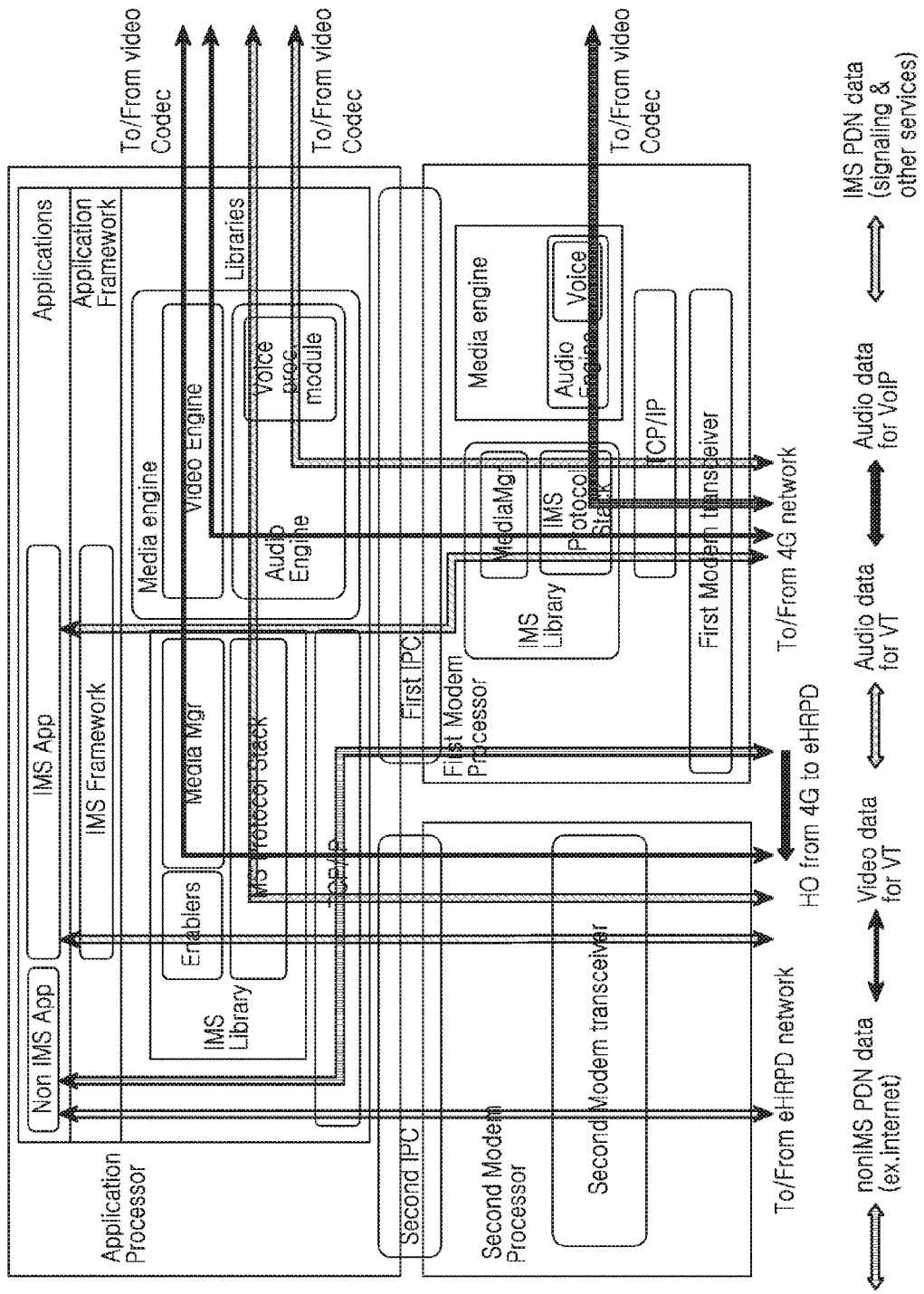
FIG. 7 is a data flow diagram for providing an IMS service in an MP of an electronic device according to an exemplary embodiment of the present invention.

FIG. 7 is a data flow diagram for providing an IMS service in an MP of an electronic device according to an exemplary embodiment of the present invention.

Referring to FIG. 7, in the voice call service, the first MP can process the audio data for the voice call service using the TCP/IP, the IMS library, and the media engine, and offer the voice call service.

In the video call service, the audio data and the video data for the video call service can be processed by the TCP/IP and the IMS library of the first MP, and the media engine of the AP.

Hence, the data router can send the IMS data and the IMS signal to the TCP/IP of the first MP and send the non IMS data to the corresponding application through the TCP/IP of the AP.

Figure 8:
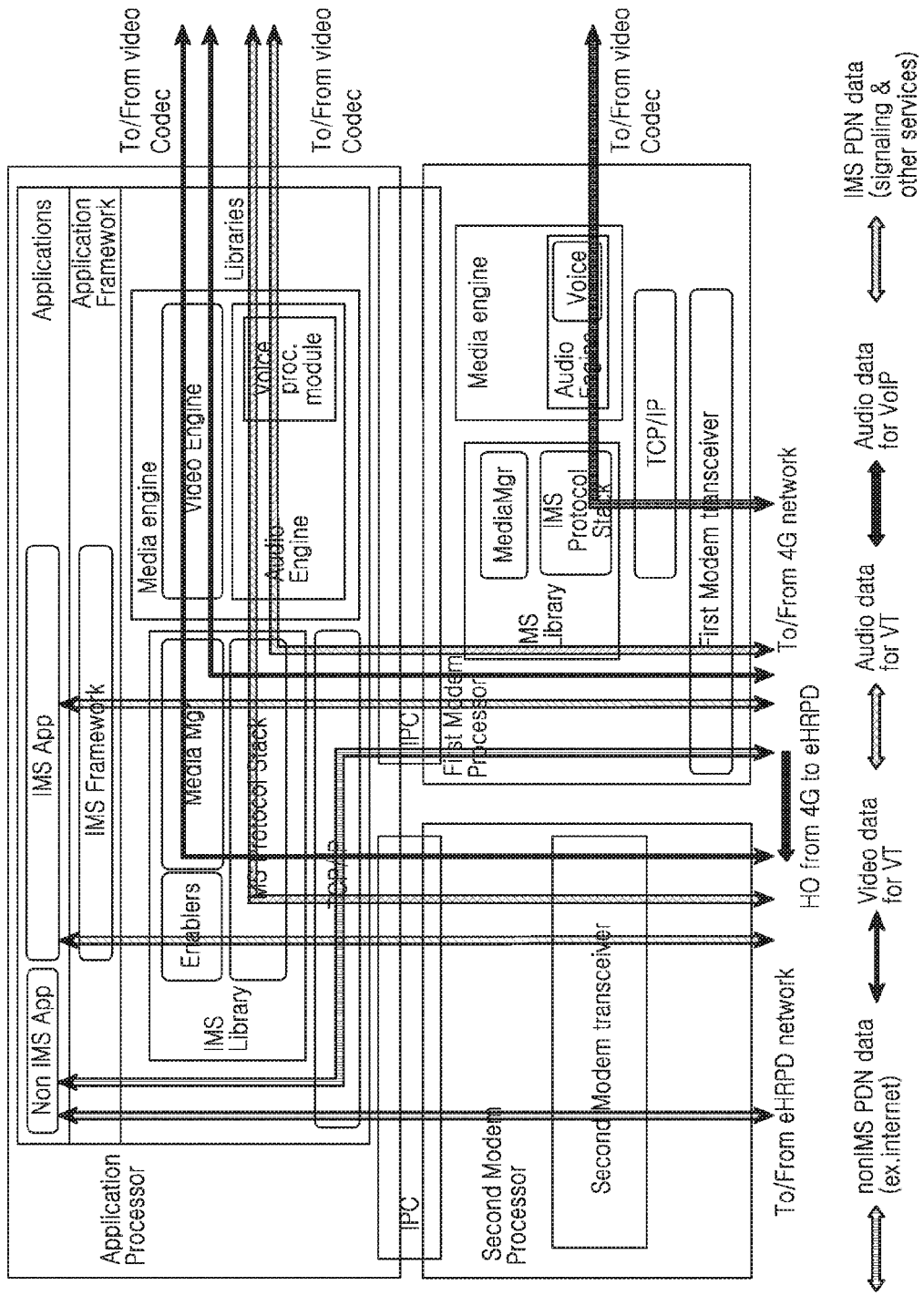
FIG. 8 is a data flow diagram for providing an IMS service in an MP of an electronic device according to an exemplary embodiment of the present invention.

FIG. 8 is a data flow diagram for providing an IMS service in an MP of an electronic device according to an exemplary embodiment of the present invention.

Referring to FIG. 8, in the voice call service, the first MP can process the audio data for the voice call service using the TCP/IP, the IMS library, and the media engine, and offer the voice call service over the PS network.

In the video call service, the audio data and the video data for the video call service can be processed by the TCP/IP, the IMS library, and the media engine of the AP.

Hence, when the voice call service is switched to the video call service, the AP can offer the video call service by driving the TCP/IP, the IMS library, and the media engine for the video call service.

When the video call service is switched to the voice call service, the AP can drive the TCP/IP, the IMS library, and the media engine of the first MP. Thus, the first MP can process the voice data using the TCP/IP, the IMS library, and the media engine, and offer the voice call service.

As such, when the first MP provides the voice call service and the AP provides the video call service, the data router of the first MP can send the audio signal for the voice call service to the TCP/IP of the first MP and send the IMS signal and the data (e.g., the audio data and the video data) for the video call service to the TCP/IP of the AP.

Figure 9:
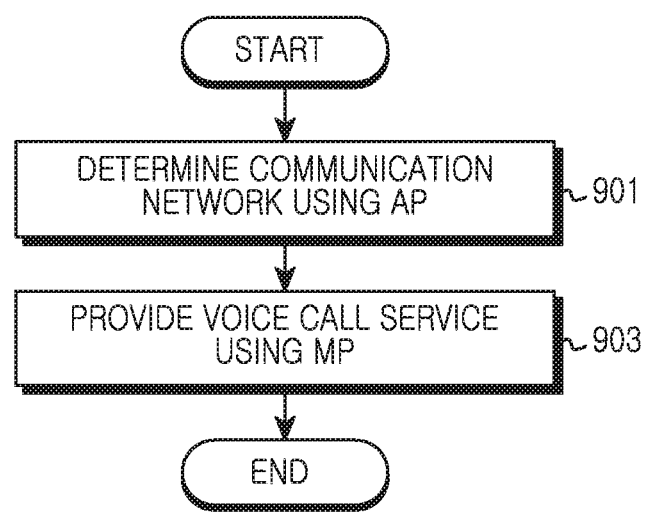
FIG. 9 is a flowchart of a method for providing a voice service in an MP according to an exemplary embodiment of the present invention.

When the second IMS protocol stack 244 of FIG. 2 is a subset of the first IMS protocol stack, the electronic device can offer the voice call service over the PS network using the MP of FIG. 9.

FIG. 9 is a flowchart of a method for providing a voice service in an MP according to an exemplary embodiment of the present invention.

Referring to FIG. 9, in step 901, the electronic device determines whether to provide the communication service over the network using the AP. For example, the electronic device determines whether the electronic device can provide the communication service over the LTE network.

If the electronic device determines to provide the communication service over the network using the AP in step 901, then the electronic device proceeds to step 903 in which the electronic device provides the voice call service over the PS network using the MP. For example, to provide the voice call service over the LTE network, the IMS service controller 224 of the AP 103 of FIG. 2 drives the second media engine 242, the second IMS protocol stack 244, and the TCP/IP 246 of the MP 105. Next, the MP 105 provides the voice call service over the PS network using the second media engine 242, the second IMS protocol stack 244, and the TCP/IP 246. In so doing, the electronic device can reduce the power consumption by turning off the AP.

Next, the electronic device finishes this process.

Figure 10:
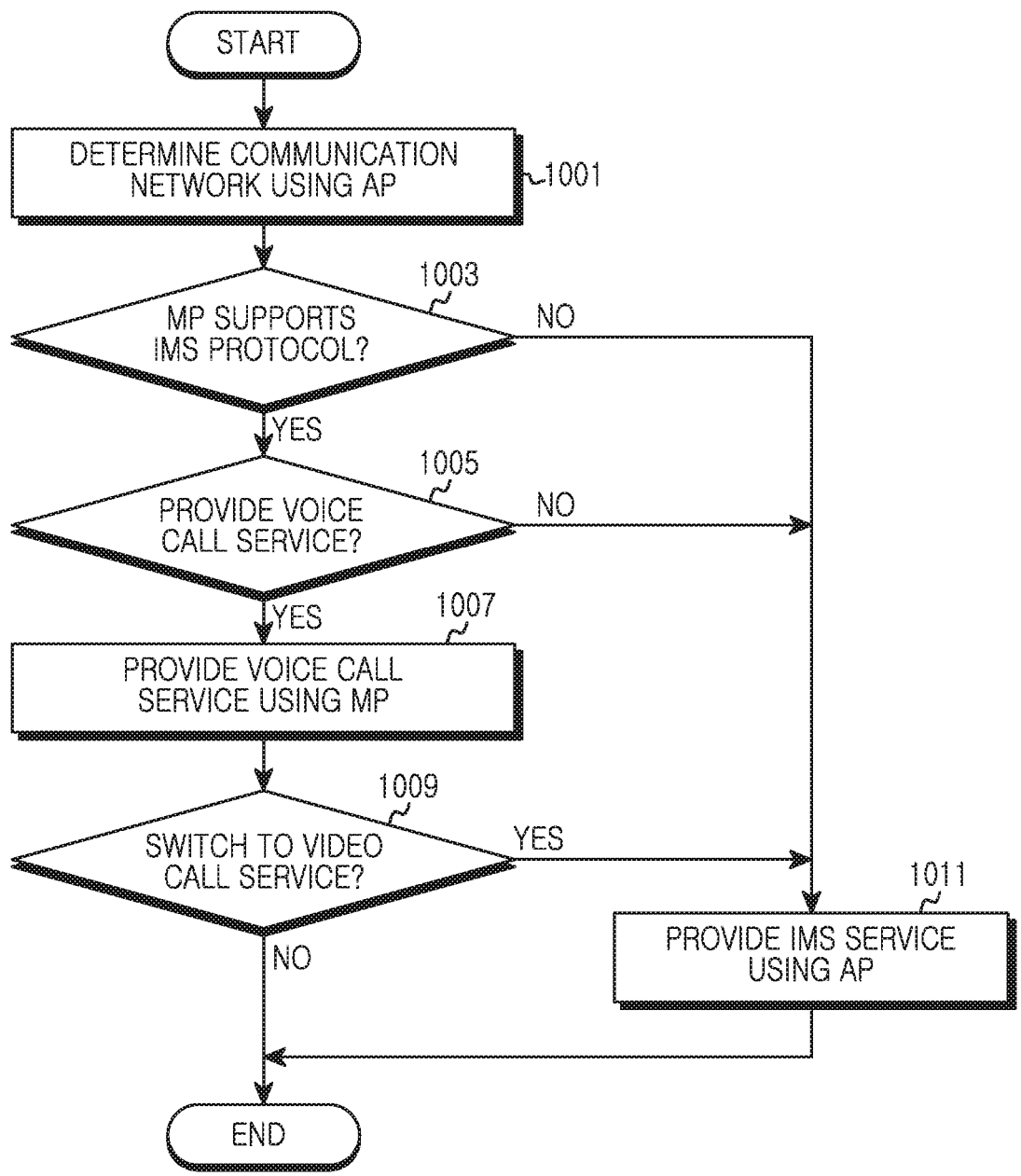
FIG. 10 is a flowchart of a method for providing a voice service in an MP according to an exemplary embodiment of the present invention.
Figure 11:
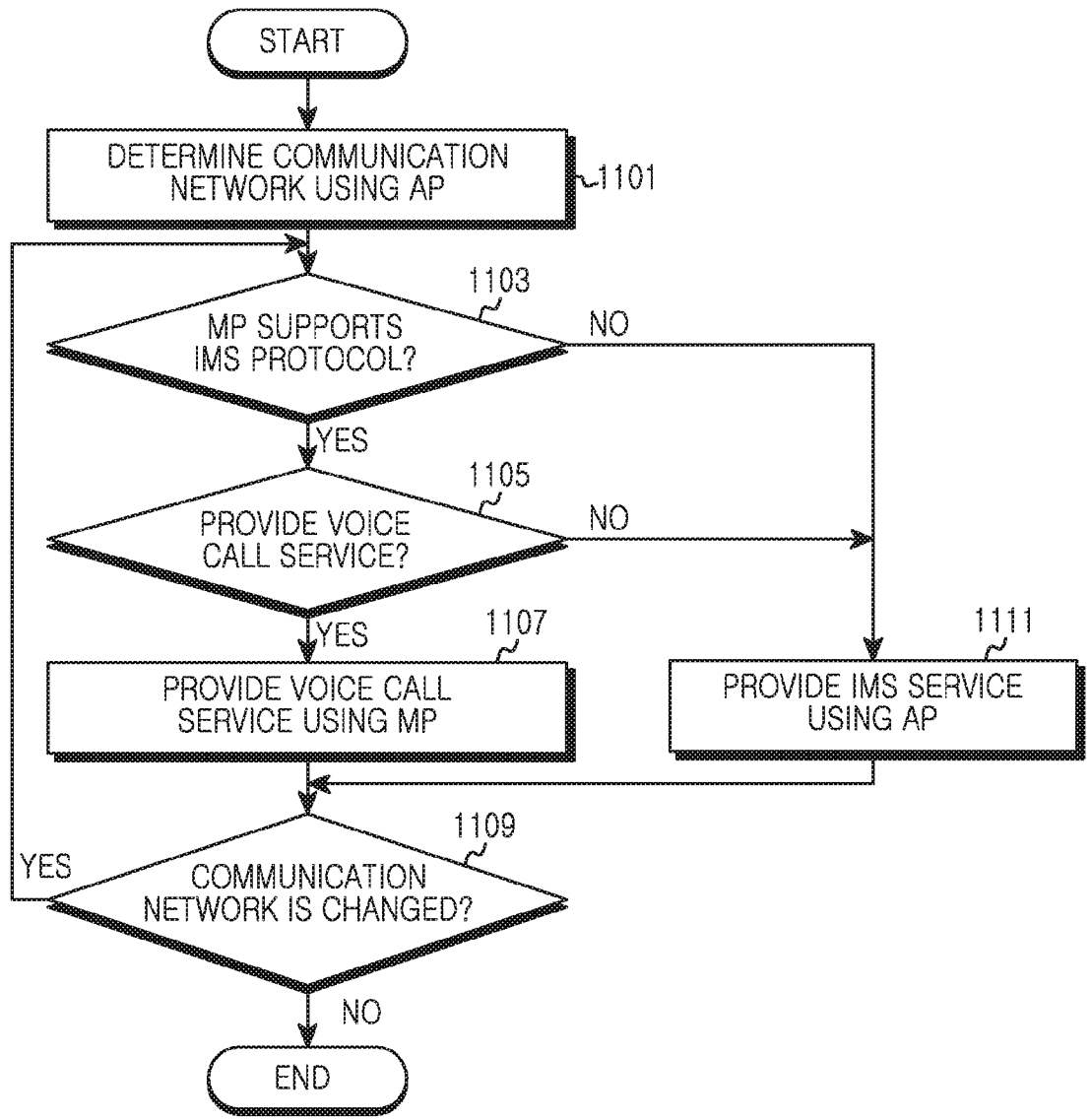
FIG. 11 is a flowchart of a method for providing a voice service in an MP according to an exemplary embodiment of the present invention.

When the electronic device includes a plurality of MPs, the electronic device can provide the IMS service according to whether the MP supports the IMS protocol as shown in FIG. 10 or FIG. 11.

FIG. 10 is a flowchart of a method for providing a voice service in an MP according to an exemplary embodiment of the present invention.

Referring to FIG. 10, in step 1001, the electronic device determines the network for the communication service using the AP. For example, when the electronic device includes the LTE MP and the eHRPD MP, the electronic device determines whether the electronic device can provide the communication service over the LTE network according to the priority. When the electronic device determines that the electronic device does not provide the communication service over the LTE network, the electronic device determines whether the electronic device can provide the communication service using the eHRPD.

In step 1003, the electronic device determines whether the MP of the network for the communication service supports the IMS protocol.

If the electronic device determines that the MP of the network for the communication service supports the IMS protocol in step 1003, then the electronic device proceeds to step 1005 in which the electronic device determines whether the electronic device provides the voice call service.

If the electronic device determines that the electronic device is providing the voice call service in step 1005, then the electronic device proceeds to step 1007 in which the electronic device provides the voice call service using the MP over the PS network. For example, when providing the voice call service over the LTE network, the IMS service controller 224 of the AP 103 of FIG. 2 drives the second media engine 242, the second IMS protocol stack 244, and the TCP/IP 246 of the MP 105. Next, the MP 105 provides the voice call service using the second media engine 242, the second IMS protocol stack 244, and the TCP/IP 246. In so doing, the electronic device can reduce the power consumption by turning off the AP and the MP of the network which does not provide the communication service.

In contrast, if the electronic device determines that the electronic device is not providing a voice call service (e.g., when providing other service than the voice call service) in step 1005, then the electronic device proceeds to step 1011 in which the electronic device provides the IMS service using the AP.

In contrast, if the electronic device determines that the MP of the network for the communication service does not support the IMS protocol in step 1003, then the electronic device proceeds to step 1011 in which the electronic device provides the IMS service using the AP. In so doing, the electronic device can reduce the power consumption by turning off the MP of the network which does not provide the communication service.

When the electronic device determines that the electronic device provides the voice call service using the MP in step 1007, the electronic device proceeds to step 1009 in which the electronic device determines whether the electronic device switches to the video call service.

If the electronic device determines that the electronic device switches to the video call service in step 1009, then the electronic device proceeds to step 1011 in which the electronic device provides the video call service using the AP. For example, upon switching to the video call service, the AP offers the video call service by driving the TCP/IP, the IMS library, and the media engine for the video call service.

If the electronic device determines that the electronic device does not switch to the video call service in step 1009, the electronic device finishes the process of providing a voice service in the MP. For example, the electronic device offers the voice call service over the PS network using the MP.

FIG. 11 is a flowchart of a method for providing a voice service in an MP according to an exemplary embodiment of the present invention.

Referring to FIG. 11, in step 1101, the electronic device determines the network for the communication service using the AP. For example, when the electronic device includes the LTE MP and the eHRPD MP, the electronic device determines whether the electronic device can provide the communication service over the LTE network according to the priority. When not providing the communication service over the LTE network, the electronic device determines whether the electronic device can provide the communication service using the eHRPD.

In step 1103, the electronic device determines whether the MP of the network for the communication service supports the IMS protocol.

If the electronic device determines that the MP of the network for the communication service supports the IMS protocol in step 1103, then the electronic device proceeds to step 1105 in which the electronic device determines whether the electronic device provides the voice call service.

If the electronic device determines that the electronic device provides the voice call service in step 1105, then the electronic device proceeds to step 1107 in which the electronic device provides the voice call service over the PS network using the MP. For example, when the electronic device determines that the electronic device provides the voice call service over the LTE network, the IMS service controller 224 of the AP 103 of FIG. 2 drives the second media engine 242, the second IMS protocol stack 244, and the TCP/IP 246 of the MP 105. Next, the MP 105 provides the voice call service using the second media engine 242, the second IMS protocol stack 244, and the TCP/IP 246. In so doing, the electronic device can reduce the power consumption by turning off the AP and the MP of the network which does not provide the communication service.

If the electronic device determines that the electronic device does not provide the voice call service (e.g., when providing other service than the voice call service) in step 1105, then the electronic device proceeds to step 1111 in which the electronic device provides the IMS service using the AP.

In contrast, if the electronic device determines that the MP of the network for the communication service does not support the IMS protocol in step 1103, then the electronic device proceeds to step 1111 in which the electronic device provides the IMS service using the AP. In so doing, the electronic device can reduce the power consumption by turning off the MP of the network not providing the communication service.

When providing the voice call service using the MP in step 1107, the electronic device proceeds to step 1109 in which the electronic device determines whether the communication network. For example, the electronic device determines whether the electronic device hands over from the LTE network to the eHRPD network.

If the electronic device determines that the communication network is changed in step 1109, then the electronic device returns to step 1103 in which the electronic device determines whether the MP of the changed communication network supports the IMS protocol back.

In contrast, if the electronic device determines that the communication network is not changed in step 1109, then the electronic device finishes the process of providing the voice service in the MP. For example, the electronic device continuously provides the voice call service using the MP.

As such, when the handover takes place between the two MPs, the electronic device can provide the voice call service of the MP using the AP. In this case, the IMS protocol stack of the MP and the IMS protocol stack of the AP should be synchronized and linked. For example, when accessing the LTE network, the electronic device provides the voice call service using the LTE MP. When the electronic device hands over to the eHRPD network, the LTE MP sends the necessary information for the voice call service, such as session information, to the IMS protocol stack of the AP. The AP can maintain the voice call service over the eHRPD network using the necessary information for the voice call service received from the LTE MP.

In so doing, when not executing the communication protocol to check the channel condition of the LTE network, the electronic device can reduce the power consumption by turning off the LTE MP.

FIG. 12 is a data flow diagram for providing a voice service in an MP of an electronic device according to an exemplary embodiment of the present invention.

Referring to FIG. 12, the MP is the subset of the IMS protocol of the AP. For example, the MP can include the TCP/IP and the RTP/RTCP of the IMS protocol.

The AP processes data other than the IMS signal and the voice call service. In addition, in the voice call service, the AP sets the call through the SIP signaling and activates the TCP/IP, the RTP/RTCP, and the media engine of the MP.

The MP offers the voice call service over the PS network using the TCP/IP, the RTP/RTCP, and the media engine. In so doing, the AP can be deactivated to reduce the power consumption of the electronic device. However, the deactivated AP is periodically activated for the periodic session refresh during the voice call service.

When the MP provides the voice call service over the PS network, the data router sends the signal for the call connection and the data (the audio data and the video data) for the voice call service to the TCP/IP of the AP. The data router sends the audio signal for the voice call service to the TCP/IP of the MP.

FIG. 13 is a data flow diagram for providing a voice service in an MP of an electronic device according to an exemplary embodiment of the present invention.

Referring to FIG. 13, the MP is the subset of the IMS protocol of the AP. For example, the MP can include the TCP/IP, and the sub SIP (the light SIP) and the RTP/RTCP of the IMS protocol.

The AP processes data other than the IMS signal and the voice call service. In addition, in the voice call service, the AP sets the call through the SIP signaling and then activates the TCP/IP, the RTP/RTCP, and the media engine of the MP. Also, the AP sends the necessary information for the session fresh for the voice call service to the sub SIP of the MP.

The MP offers the voice call service over the PS network using the TCP/IP, the RTP/RTCP, and the media engine. The MP also performs the periodic session refresh using the sub SIP during the voice call service. In so doing, the AP can be turned off to reduce the power consumption of the electronic device.

When the MP provides the voice call service over the PS network, the data router sends the signal for the call connection and the data (the audio data and the video data) for the video call service to the TCP/IP of the AP. The data router sends the audio signal for the voice call service to the TCP/IP of the MP.

As such, the MP performs the session refresh using the sub SIP. To distinguish the signal regarding the sub SIP among the IMS signals, the data router can include an IMS signaling router as shown in FIG. 14.

Figure 14:
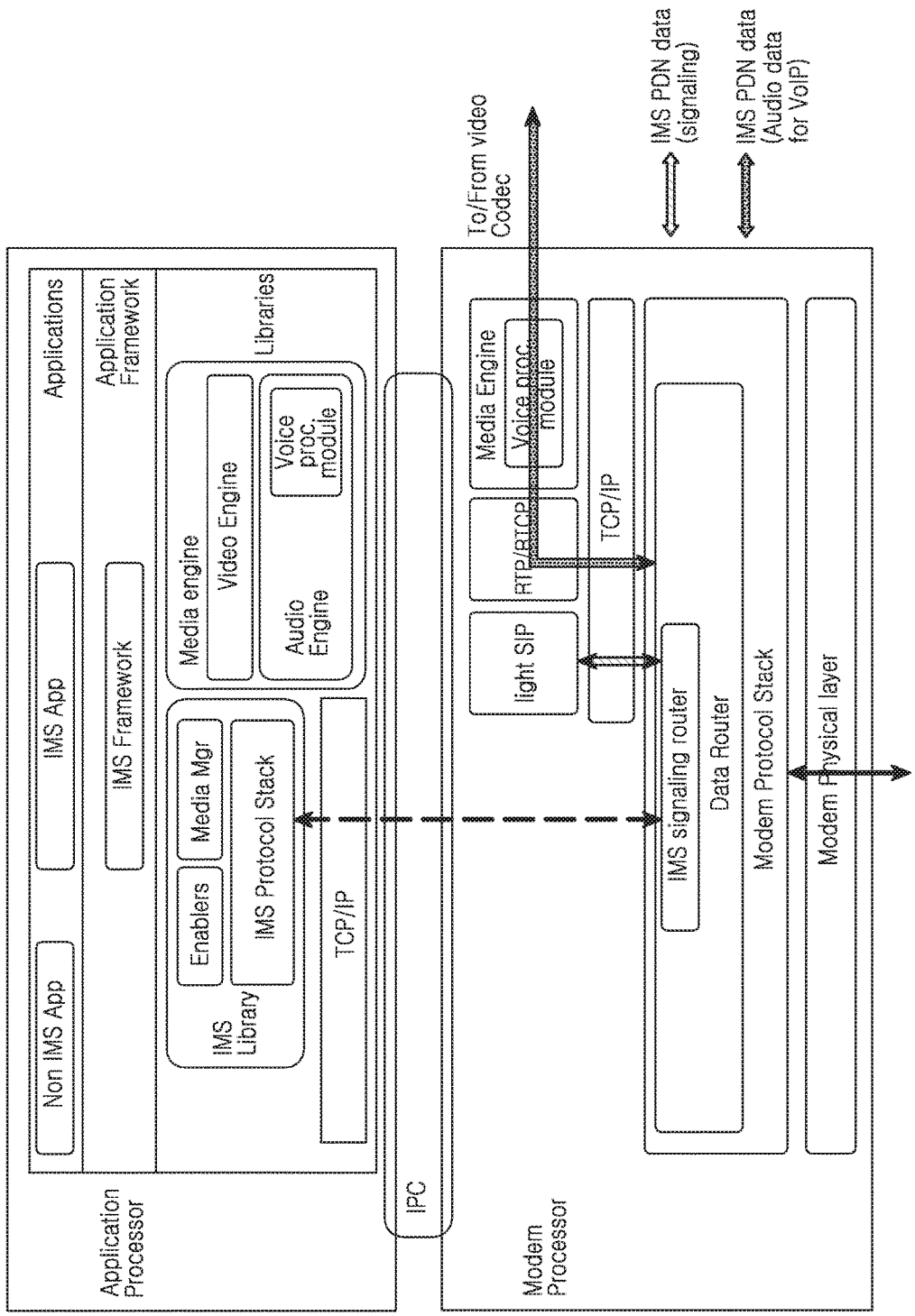
FIG. 14 is a data flow diagram for providing a voice service in an MP of an electronic device according to an exemplary embodiment of the present invention.

FIG. 14 is a data flow diagram for providing a voice service in an MP of an electronic device according to an exemplary embodiment of the present invention.

Referring to FIG. 14, the IMS signaling router can classify the IMS signal, and route the signal regarding the session refresh processed by the sub SIP to the sub SIP and route other signal to the IMS protocol stack of the AP. The IMS signaling router processes all of the IMS signals sent from the sub IP of the MP and the IMS protocol stack of the AP.

Operating of the sub SIP may be limited to cases when the sub SIP operation is required (e.g., for the voice call service), under control of the IMS protocol stack of the AP. Hence, the IMS signaling router routes the IMS signal to the sub SIP only when the sub SIP is driven, and routes the IMS signal to the AP when the sub SIP is not driven.

The deactivated AP during the voice call service may be activated when receiving the IMS signal from the IMS signaling router.

Figure 15:
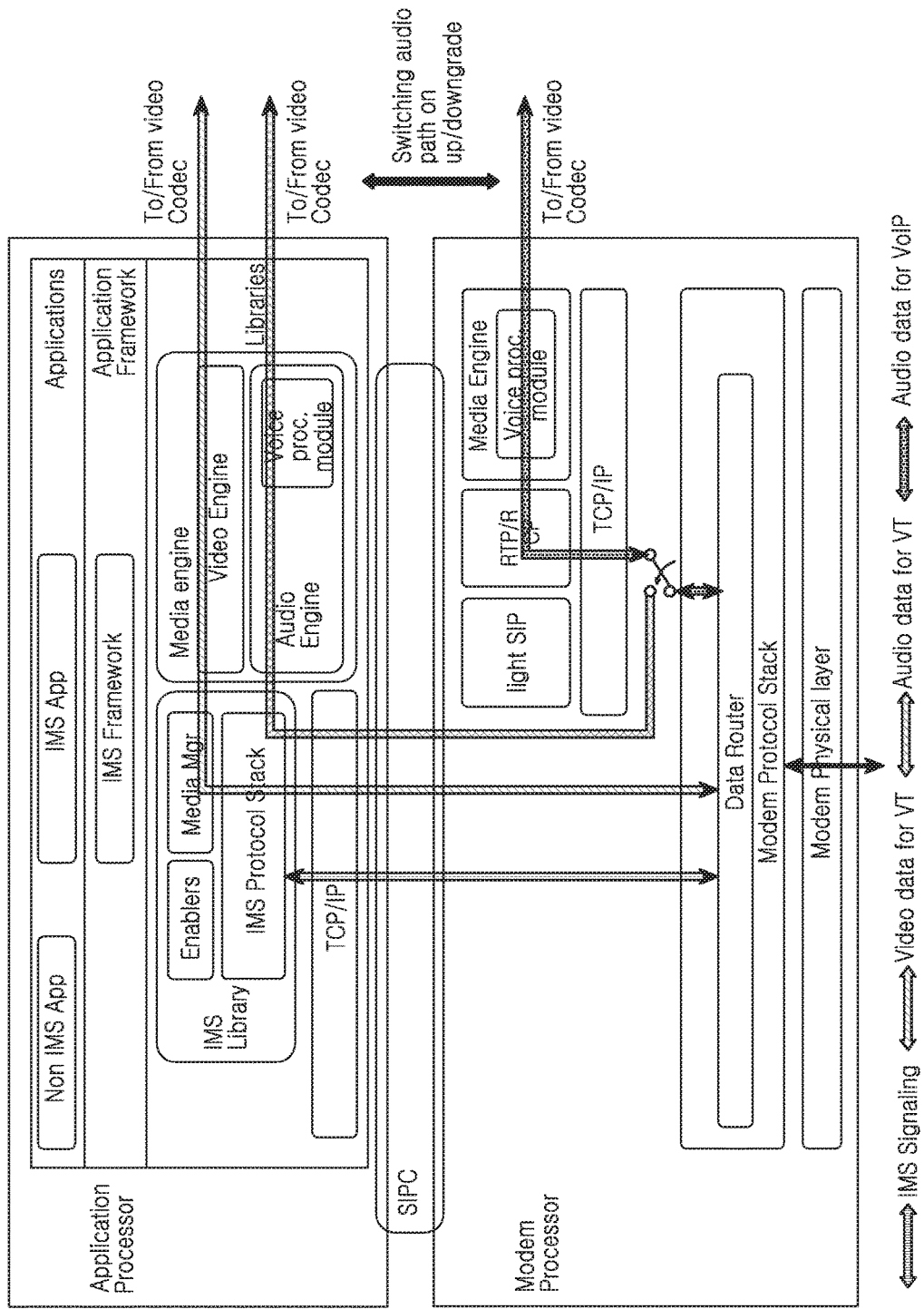
FIG. 15 is a data flow diagram for a service change in an MP of an electronic device according to an exemplary embodiment of the present invention.

FIG. 15 is a data flow diagram for a service change in an MP of an electronic device according to an exemplary embodiment of the present invention.

Referring to FIG. 15, the MP includes a subset of the IMS protocol of the AP. For example, the MP can include the TCP/IP, and the sub SIP (the light SIP) and the RTP/RTCP of the IMS protocol.

The MP provides the voice call service over the PS network using the TCP/IP, the RTP/RTCP, and the media engine. For example, the AP sets the call through the SIP signaling and then activates the TCP/IP, the RTP/RTCP, and the media engine of the MP. Hence, the MP can offer the voice call service over the PS network using the TCP/IP, the RTP/RTCP, and the media engine.

When the voice call service is switched to the video call service, the AP can offer the video call service by driving the TCP/IP, the IMS library, and the media engine for the video call service.

The data router of the MP can send the audio signal for the voice call service to the TCP/IP of the MP, and send the signal and the data (the audio data and the video data) for the video call service to the TCP/IP of the AP. When the voice call service is switched to the video call service and the TCP/IP, the IMS library, and the media engine of the AP are driven for the video call service, the data router can switch the voice data path from the TCP/IP of the MP to the TCP/IP of the AP.

Figure 16:
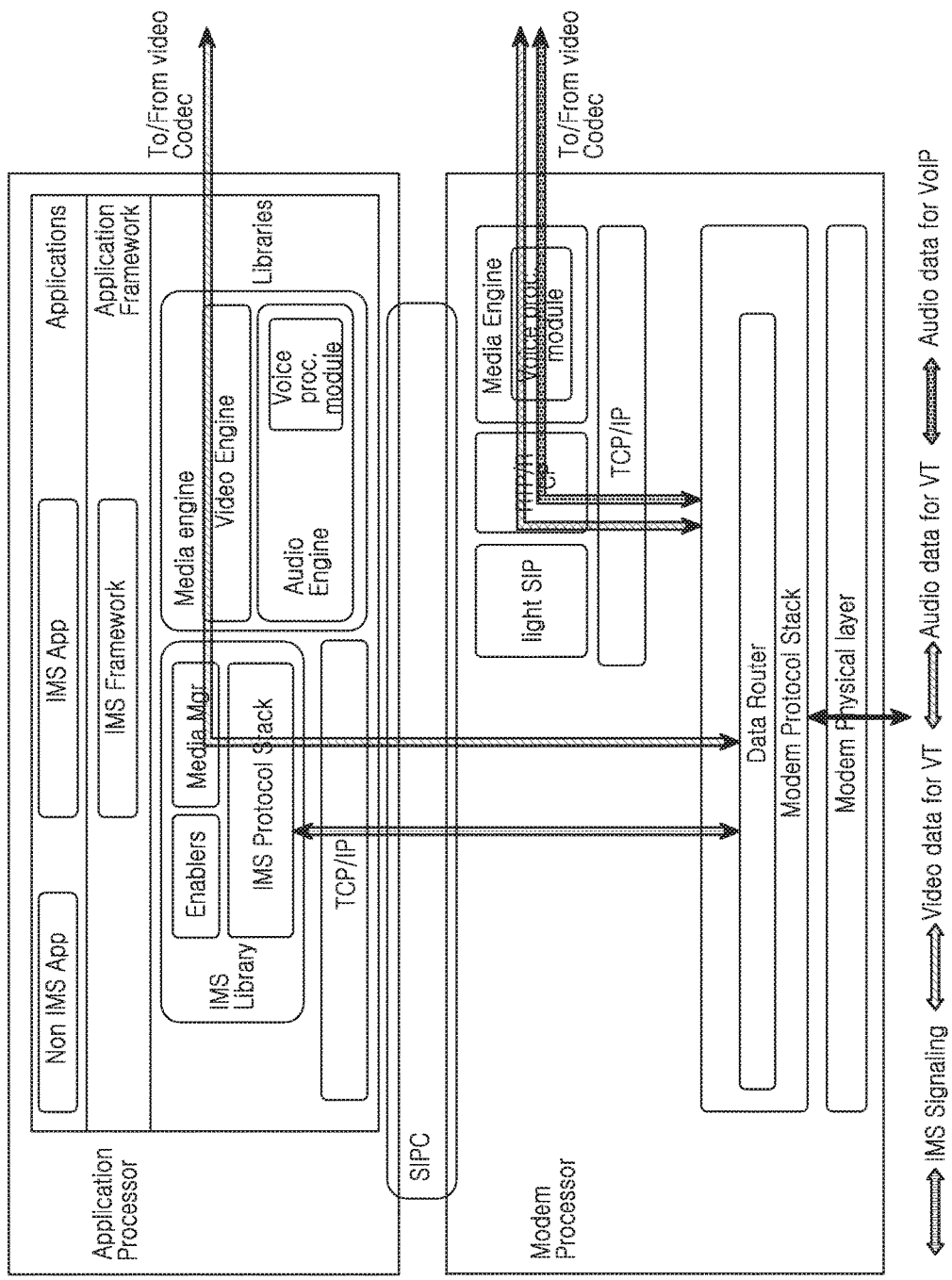
FIG. 16 is a data flow diagram for a service change in an MP of an electronic device according to an exemplary embodiment of the present invention.

FIG. 16 is a data flow diagram for a service change in an MP of an electronic device according to an exemplary embodiment of the present invention.

Referring to FIG. 16, the MP includes a subset of the IMS protocol of the AP. For example, the MP can include the TCP/IP, the sub SIP (the light SIP), and the RTP/RTCP of the IMS protocol.

The MP provides the voice call service over the PS network using the TCP/IP, the RTP/RTCP, and the media engine. For example, the AP sets the call through the SIP signaling and then activates the TCP/IP, the RTP/RTCP, and the media engine of the MP. Hence, the MP offers the voice call service over the PS network using the TCP/IP, the RTP/RTCP, and the media engine.

When the voice call service is switched to the video call service, the audio data for the video call service can be processed by the TCP/IP, the RTP/RTCP, and the media engine of the MP. The video data for the video call service is processed by the TCP/IP, the IMS protocol stack, and the media engine of the AP. For example, when the voice call service is switched to the video call service, the data router does not switch the voice data path but sends the voice data to the TCP/IP of the MP. Meanwhile, the data router can send the IMS signal and the video data to the TCP/IP of the AP so that the AP can process the IMS signal and the video data.

As such, when the different processors process the video data and the audio data for the video call service, the AP and the MP can exchange the information to synchronize the two data.

Figure 17:
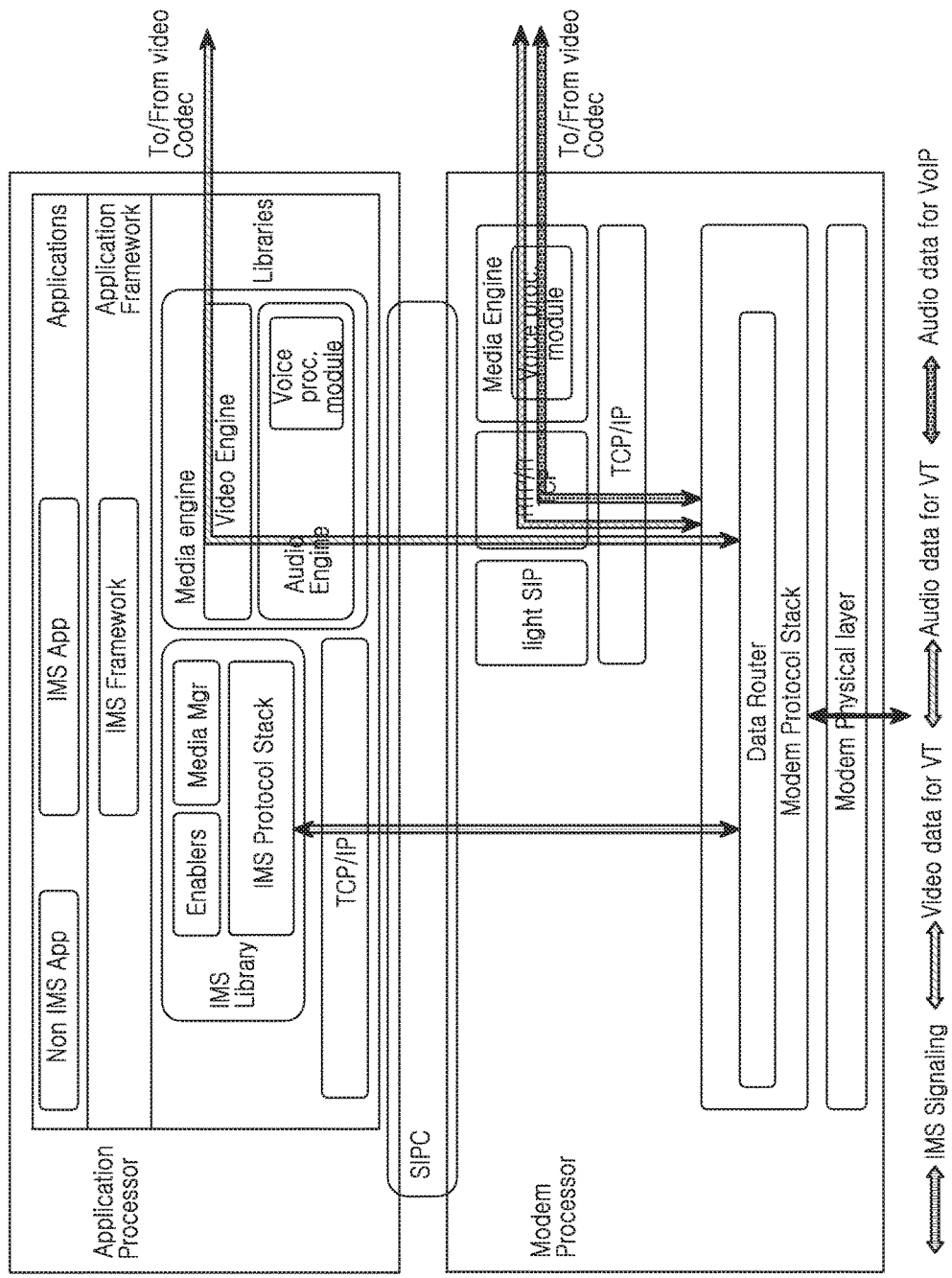
FIG. 17 is a data flow diagram for a service change in an MP of an electronic device according to an exemplary embodiment of the present invention.

FIG. 17 is a data flow diagram for a service change in an MP of an electronic device according to an exemplary embodiment of the present invention.

Referring to FIG. 17, the MP includes a subset of the IMS protocol of the AP. For example, the MP can include the TCP/IP, the sub SIP (the light SIP), and the RTP/RTCP of the IMS protocol.

The MP provides the voice call service over the PS network using the TCP/IP, the RTP/RTCP, and the media engine. For example, the AP sets the call through the SIP signaling and then activates the TCP/IP, the RTP/RTCP, and the media engine of the MP. Hence, the MP can offer the voice call service over the PS network using the TCP/IP, the RTP/RTCP, and the media engine.

When the voice call service is switched to the video call service, the audio data for the video call service can be processed by the TCP/IP, the RTP/RTCP, and the media engine of the MP. The video data for the video call service is processed by the TCP/IP and the RTP/RTCP of the MP, and the media engine of the AP. For example, when the voice call service is switched to the video call service, the data router does not switch the voice data path but sends the voice data and the video data to the TCP/IP of the MP. Meanwhile, the data router can send the IMS signal to the TCP/IP of the AP so that the AP can process the IMS signal.

Figure 18:
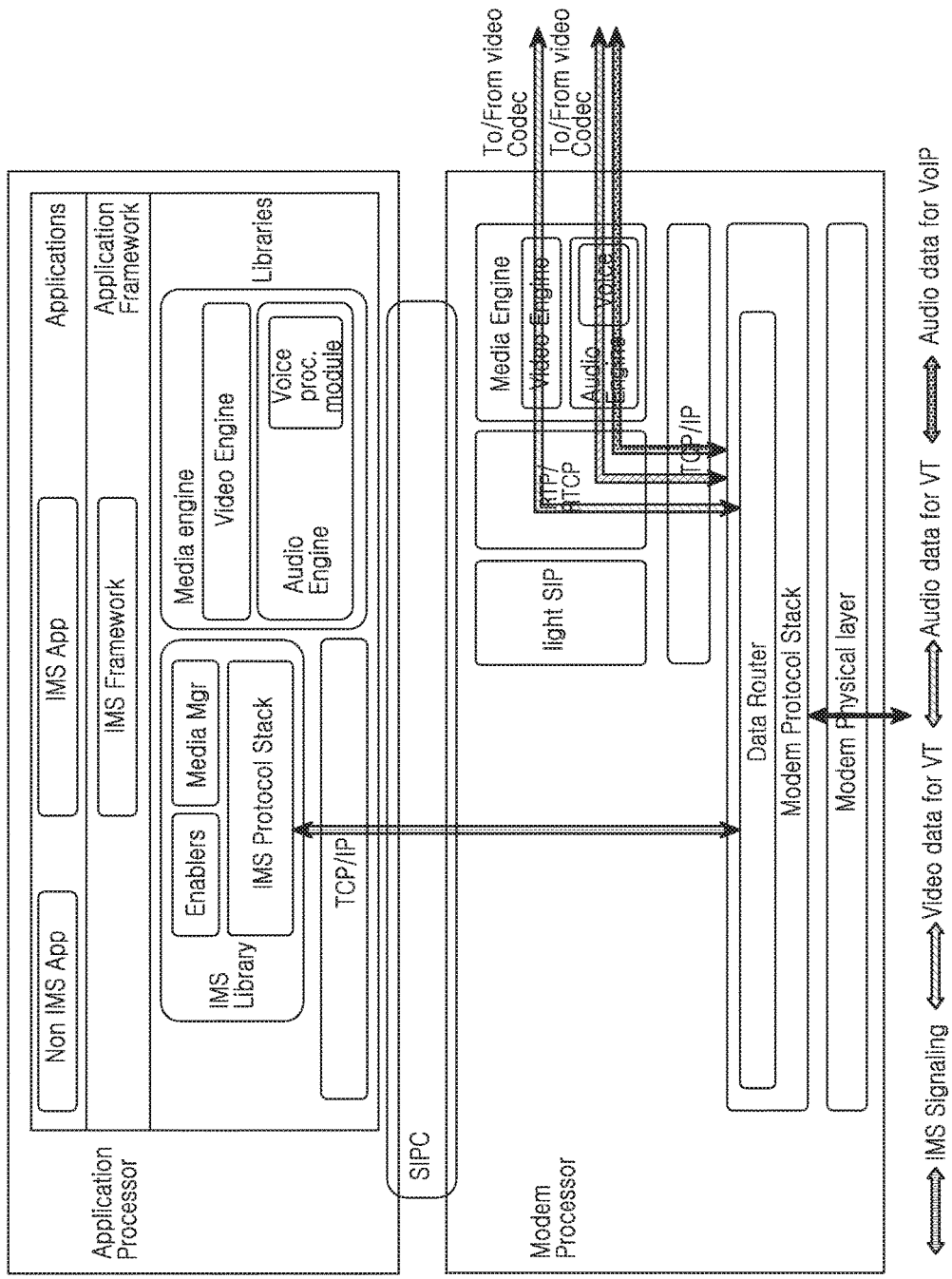
FIG. 18 is a data flow diagram for a service change in an MP of an electronic device according to an exemplary embodiment of the present invention.

FIG. 18 is a data flow diagram for a service change in an MP of an electronic device according to an exemplary embodiment of the present invention.

Referring to FIG. 18, the MP includes a subset of the IMS protocol of the AP. For example, the MP can include the TCP/IP, the sub SIP (the light SIP), and the RTP/RTCP of the IMS protocol.

The MP provides the voice call service over the PS network using the TCP/IP, the RTP/RTCP, and the media engine. For example, the AP sets the call through the SIP signaling and then activates the TCP/IP, the RTP/RTCP, and the media engine of the MP. Hence, the MP can offer the voice call service over the PS network using the TCP/IP, the RTP/RTCP, and the media engine.

When the voice call service is switched to the video call service, the audio data and the video data for the video call service can be processed by the TCP/IP, the RTP/RTCP, and the media engine of the MP. For example, when the voice call service is switched to the video call service, the data router can send the voice data and the video data to the TCP/IP of the MP without switching the voice data path. Meanwhile, the data router can send the IMS signal to the TCP/IP of the AP so that the AP can process the IMS signal.

Figure 19:
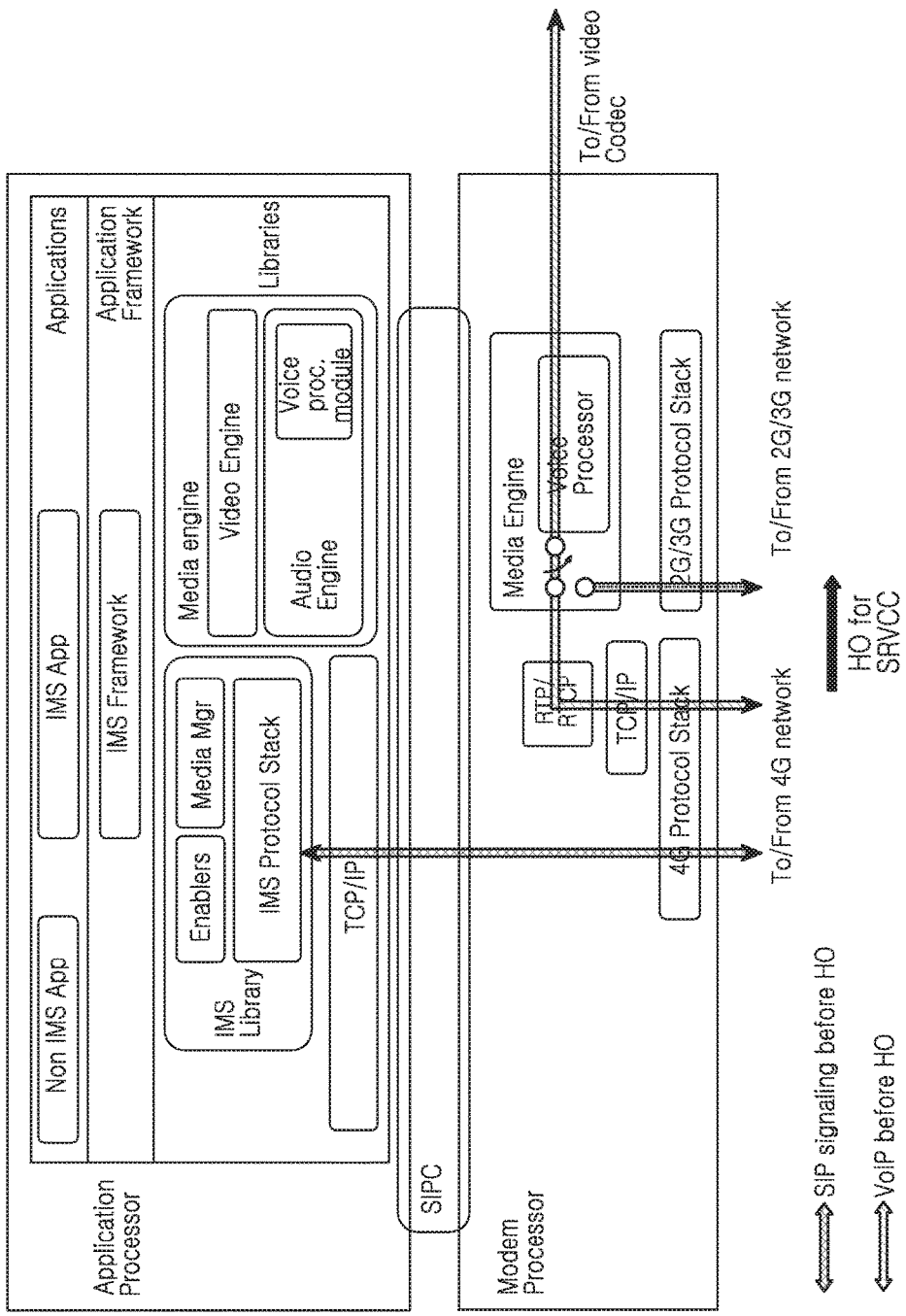
FIG. 19 is a data flow diagram of handover of a voice service in an MP of an electronic device according to an exemplary embodiment of the present invention.

FIG. 19 is a data flow diagram of a handover of a voice service in an MP of an electronic device according to an exemplary embodiment of the present invention.

Referring to FIG. 19, the MP can provide the voice call service over the PS network using the TCP/IP, the RTP/RTCP, and the media engine.

When the handover is conducted from the PS network to a Circuit Service (CS) network, which is Single Radio Voice Call Continuity (SRVCC), the MP can switch the voice data path from the PS network to the CS network through the handover between the IMS protocol stack and the CS network protocol stack.

As illustrated in FIG. 19, the MP can process both of the audio data of the PS network and the audio data of the CS network using the single audio engine. For example, the MP may include a first audio engine for processing the audio data of the PS network and a second audio engine for processing the audio data of the CS network. In this case, as the voice data path is switched from the PS network to the CS network, the MP can switch the first audio engine to the second audio engine.

In addition, after handing over from the PS network of a 4th Generation (4G) system to the CS network of a 2G or 3G system, the electronic device may perform IMS access leg release over the PS network of the 2G or 3G system.

Figure 20:
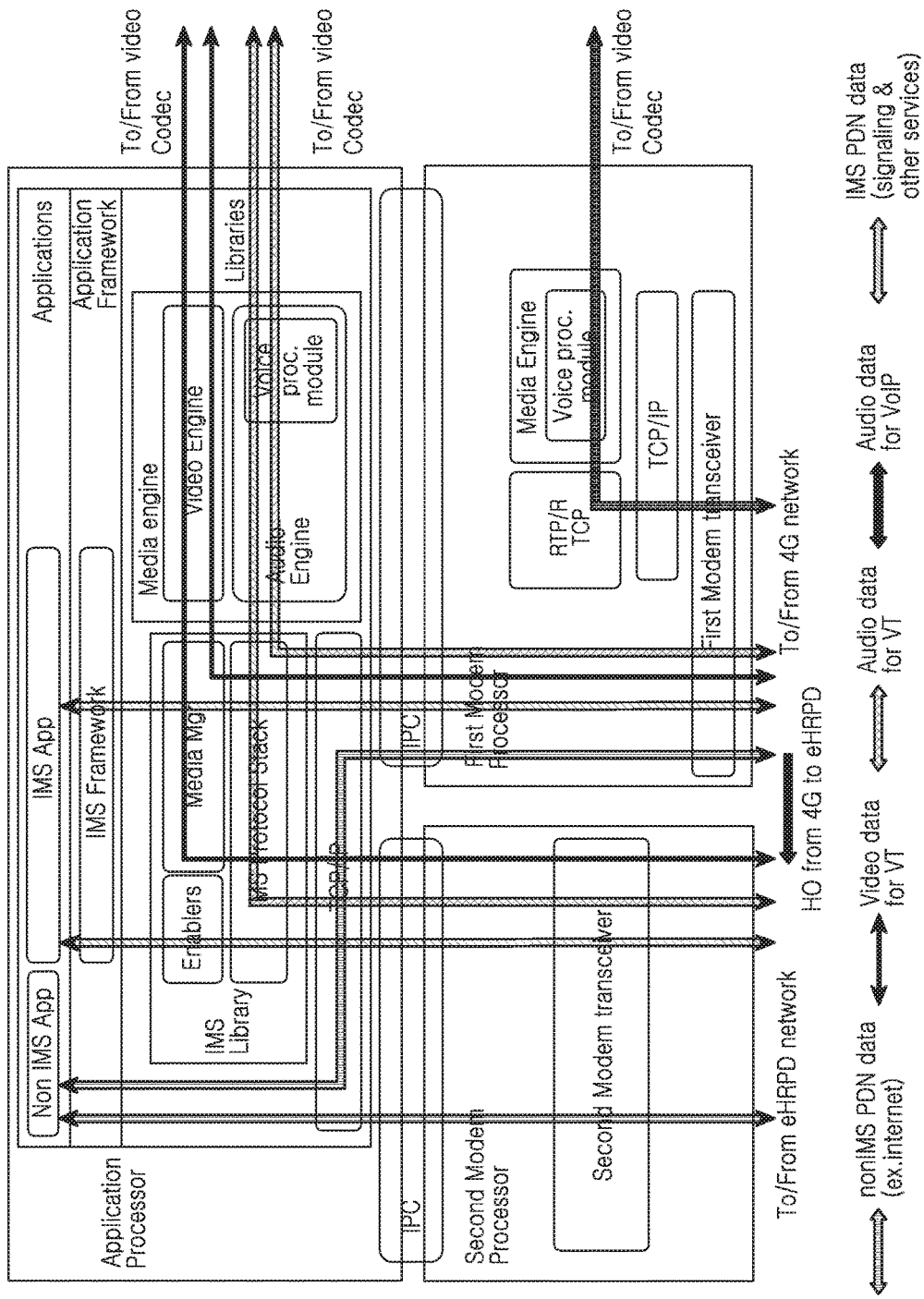
FIG. 20 is a data flow diagram of an MP change in an electronic device according to an exemplary embodiment of the present invention.

FIG. 20 is a data flow diagram of an MP change in an electronic device according to an exemplary embodiment of the present invention.

Referring to FIG. 20, a first MP includes a subset of the IMS protocol of the AP, and a second MP does not support the IMS protocol.

When the communication service is offered using the first MP, the first MP can process the audio data for the voice call service using the TCP/IP, the RTP/RTCP, and the media engine and thus provide the voice call service over the PS network.

In the video call service, the data router of the first MP can send the audio data and the video data for the video call service to the TCP/IP of the AP. The AP can provide the video call service using the TCP/IP, the IMS library, and the media engine.

Hence, the data router can send the audio data for the voice call service to the TCP/IP of the first MP, and send the IMS signal and the data (the audio data and the video data) for the video call service to the TCP/IP of the AP.

Meanwhile, when the communication service is offered using the second MP, the AP can process the IMS data received from the second MP and thus provide the IMS service.

When the handover is conducted from the first MP to the second MP, the voice call service can be forwarded from the first MP to the AP and then processed in the AP. In this case, the first MP can send the necessary information for the voice call service, such as session information, to the IMS protocol stack of the AP in order to synchronize and link the IMS protocol stack of the AP. Thus, the AP can maintain the voice call service using the necessary information for the voice call service received from the first MP.

In this exemplary embodiment of the present invention, the second MP does not support the IMS protocol.

Alternatively, when the second MP supports the IMS protocol, the voice call service can be switched from the first MP to the second MP and processed in the second MP.

Figure 21:
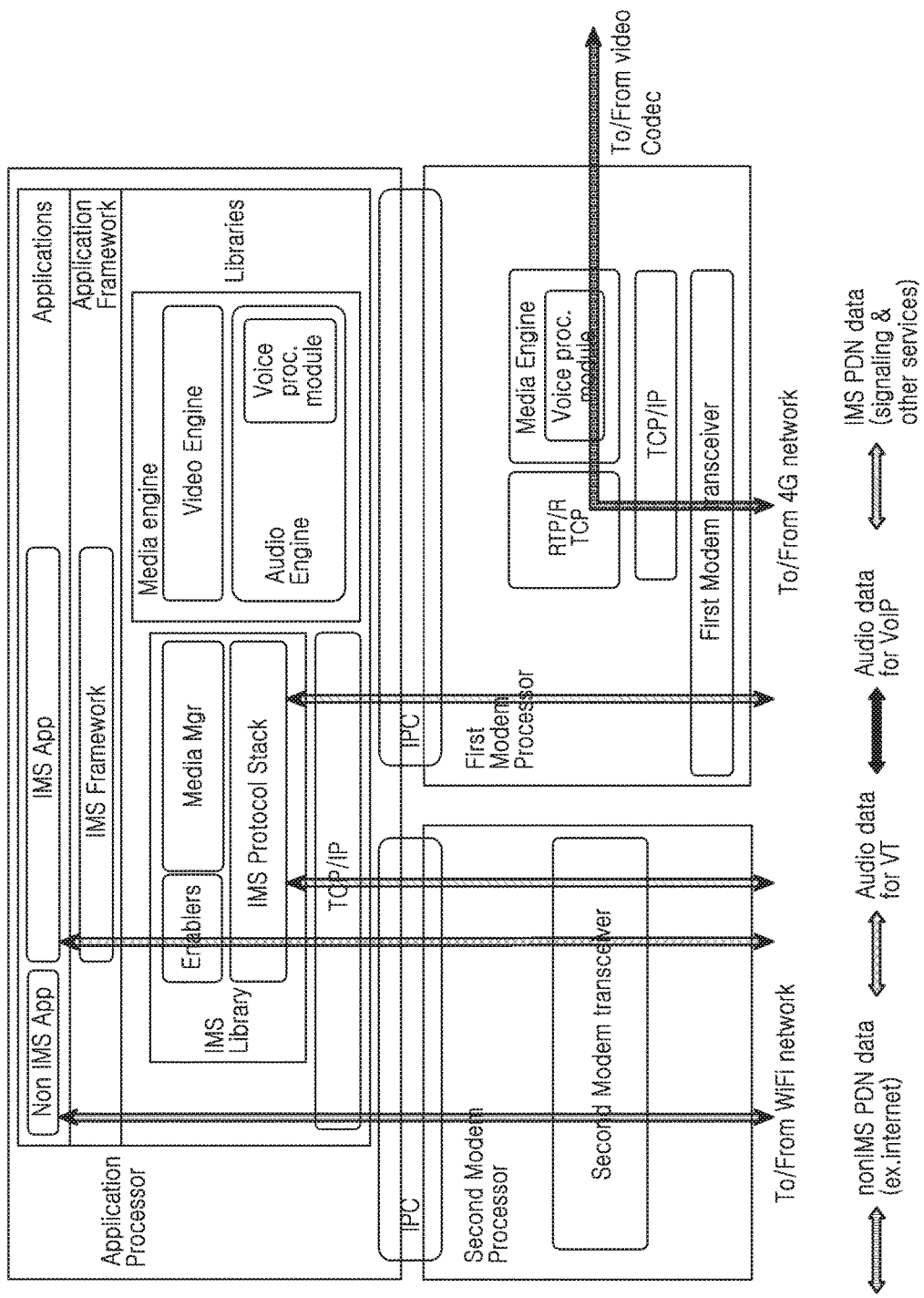
FIG. 21 is a data flow diagram of simultaneous use of a plurality of MPs in an electronic device according to an exemplary embodiment of the present invention.

FIG. 21 is a data flow diagram of simultaneous use of a plurality of MPs in an electronic device according to an exemplary embodiment of the present invention.

Referring to FIG. 21, the electronic device can use the plurality of the MPs at the same time. For example, the electronic device can concurrently use a first MP of $3^{rd}$ Generation Partnership Project (3GPP) standard and a second MP supporting wireless Internet.

In this case, the first MP provides the voice call service over the PS network, and the AP provides the non IMS service and other IMS services than the voice call service using data received through the second MP. In so doing, the AP separates and processes the IMS signal received from the first MP and the data received from the second MP.

Figure 22:
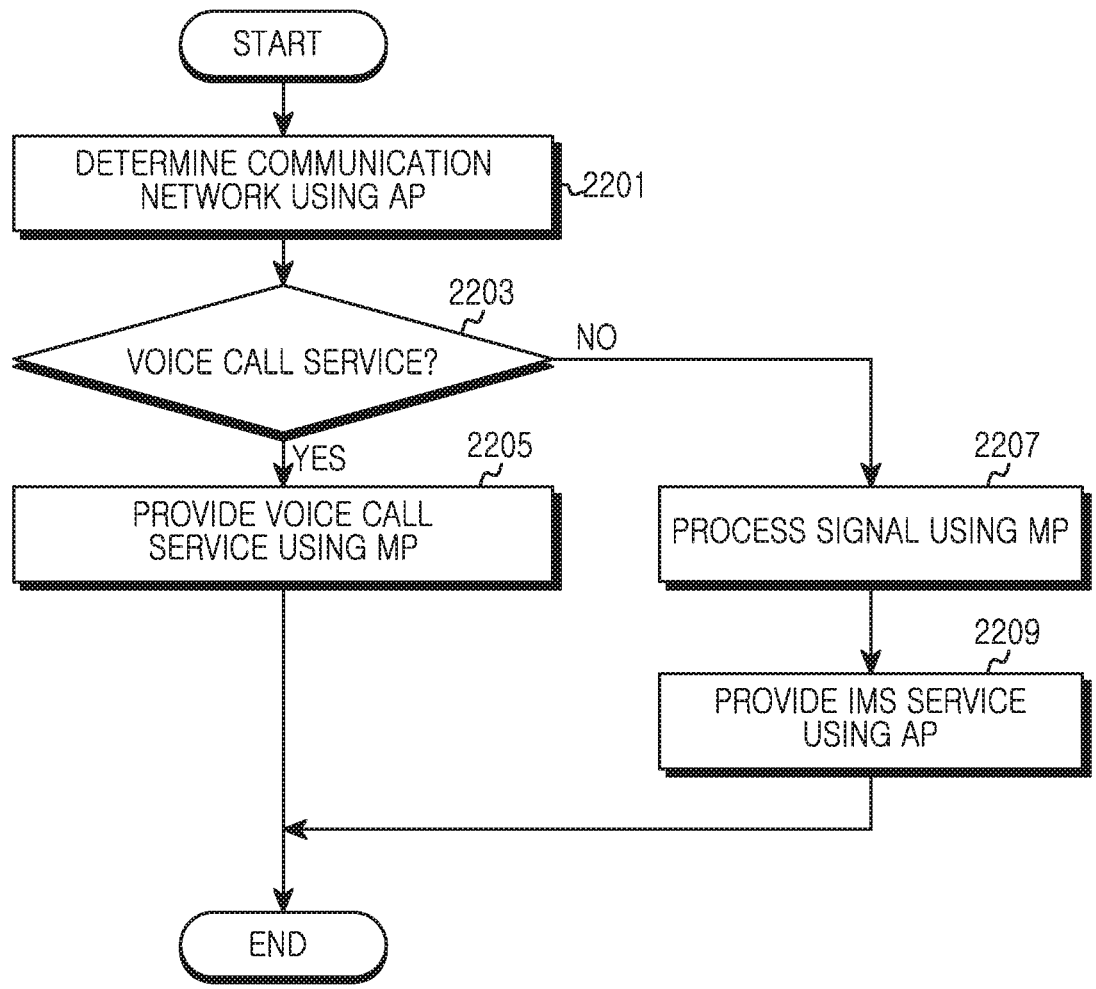
FIG. 22 is a flowchart of a method for providing a voice service in an MP according to an exemplary embodiment of the present invention.

When the first IMS protocol stack and the second IMS protocol stack 244 of FIG. 2 include different IMS protocols, the electronic device can offer the voice call service over the PS network using the MP as shown in FIG. 22.

FIG. 22 is a flowchart of a method for providing a voice service in an MP according to an exemplary embodiment of the present invention.

Referring to FIG. 22, the electronic device is assumed to provide the voice call service over the PS network using the MP.

In step 2201, the electronic device determines whether the electronic device can provide the communication service over the network using the AP. For example, the electronic device determines whether the electronic device can provide the communication service over the LTE network.

When providing the communication service, in step 2203, the electronic device determines whether the electronic device provides the voice call service.

If the electronic device determines that the electronic device provides the voice call service in step 2203, then the electronic device proceeds to step 2205 in which the electronic device provides the voice call service over the PS network using the MP. For example, when the voice call service is provided over the LTE network, the IMS service controller 224 of the AP 103 of FIG. 2 drives the second media engine 242, the second IMS protocol stack 244, and the TCP/IP 246 of the MP 105. Next, the MP 105 provides the voice call service using the second media engine 242, the second IMS protocol stack 244, and the TCP/IP 246. In so doing, the electronic device can reduce the power consumption by turning off the AP and the MP of the network which does not provide the communication service.

If the electronic device determines that the electronic device does not provide the voice call service (e.g., when providing other service than the voice call service) in step 2203, then the electronic device proceeds to step 2207 in which the electronic device primarily processes the data using the MP.

In step 2209, the electronic device provides the IMS service using the data processed by the MP, in the AP. For example, the AP provides other IMS services excluding the voice call service using the data processed by the MP.

Next, the electronic device finishes the process of providing the voice service in the MP.

Figure 23:
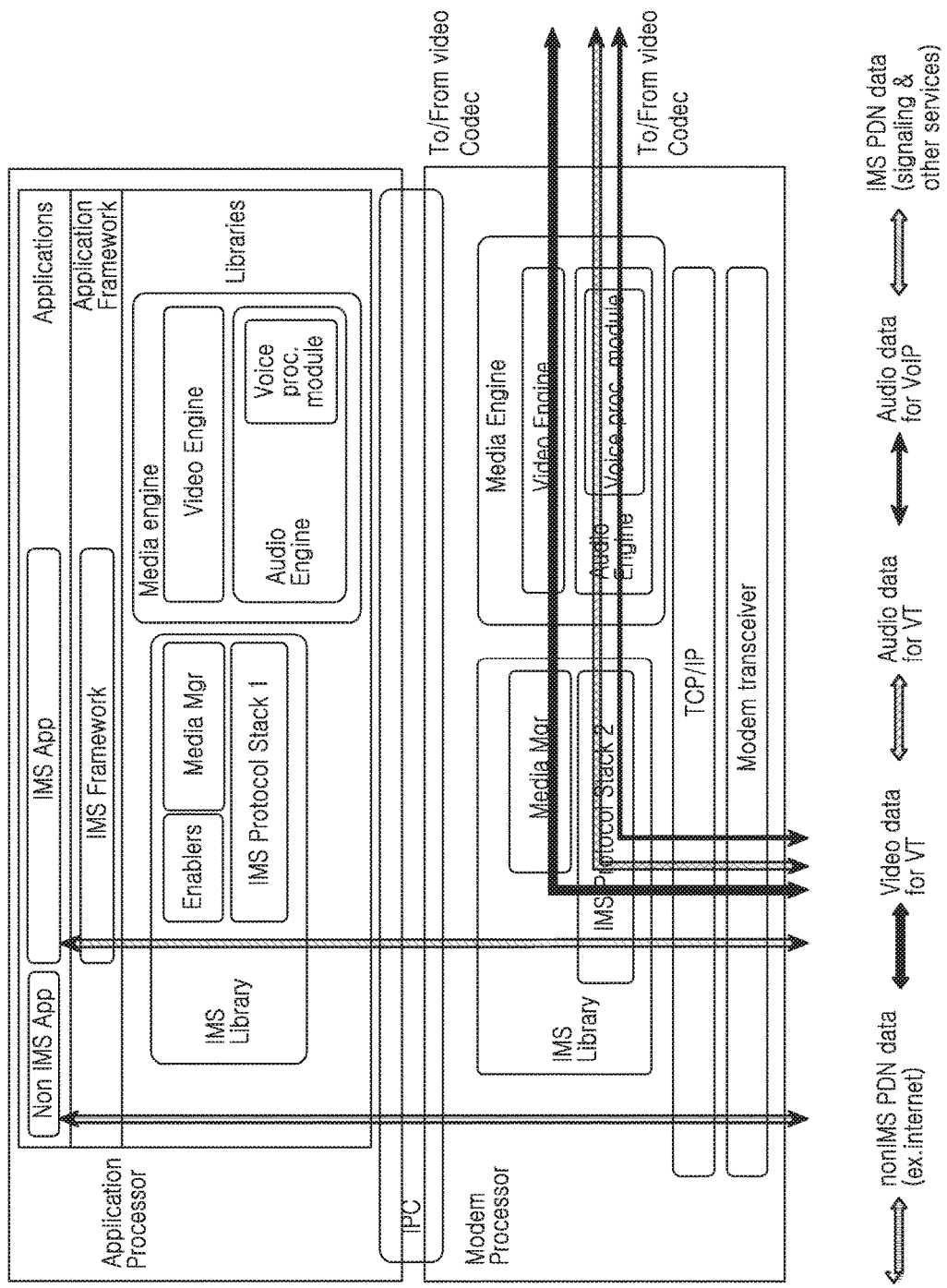
FIG. 23 is a data flow diagram for processing IMS data in an MP of an electronic device according to an exemplary embodiment of the present invention.

FIG. 23 is a data flow diagram for processing IMS data in an MP of an electronic device according to an exemplary embodiment of the present invention.

Referring to FIG. 23, the MP includes an IMS protocol different from the AP. For example, the MP can include the TCP/IP, the sub SIP (the light SIP), and the RTP/RTCP to provide the voice call service and the video call service.

The MP can offer the voice call service over the PS network using the TCP/IP, the RTP/RTCP, and the media engine.

The MP can offer the video call service over the PS network using the TCP/IP, the RTP/RTCP, and the media engine.

In so doing, the AP can process the IMS signal received through the TCP/IP of the MP.

Hence, the data router can send the audio data for the voice call service, the data (the audio data and the video data) for the video call service, and the IMS signal to the TCP/IP of the MP.

According to this exemplary embodiment of the present invention, the MP processes the IMS signal.

Alternatively, the AP may secondarily process the processed IMS signal received from the MP using the first IMS protocol stack.

Figure 24:
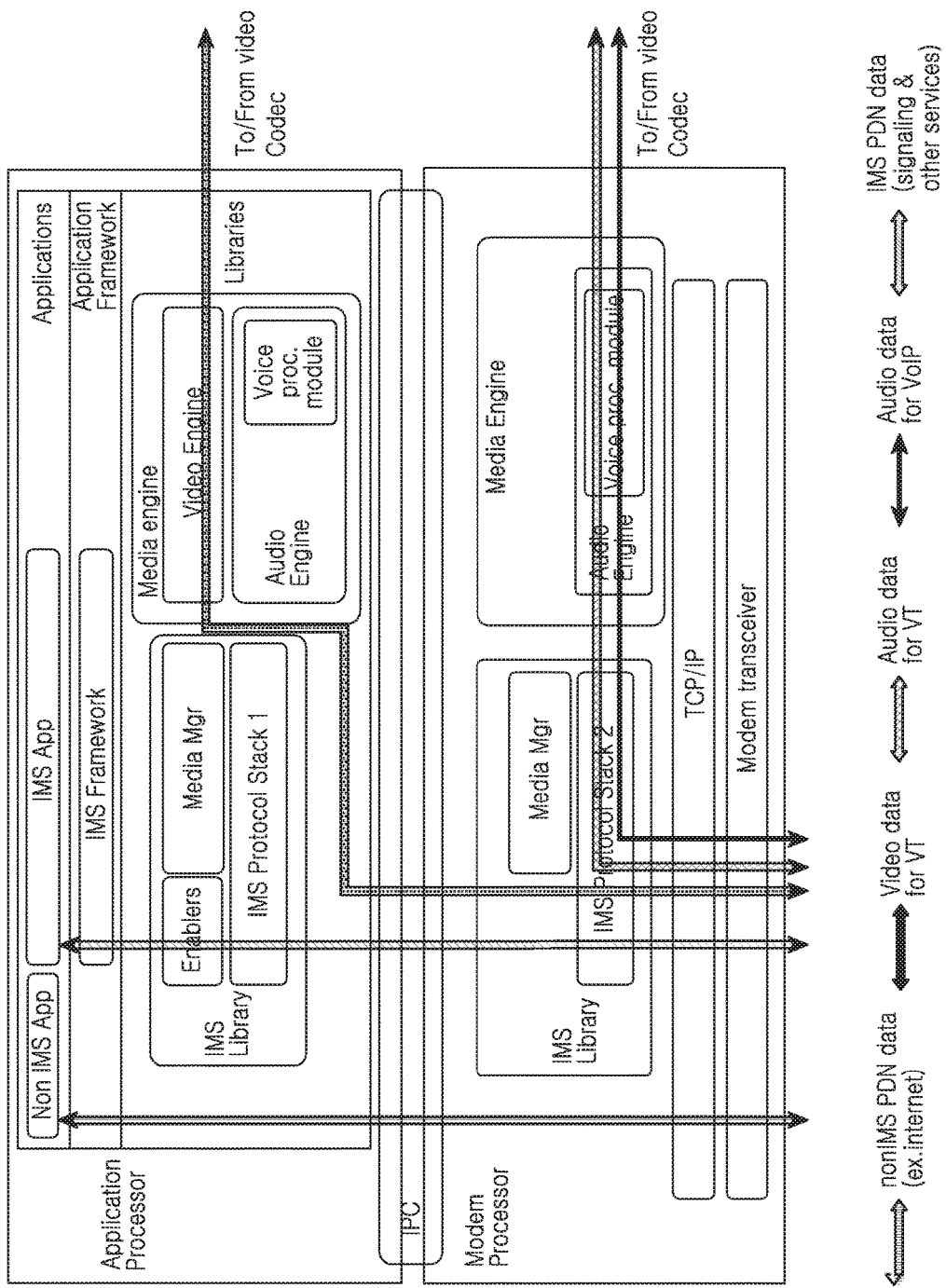
FIG. 24 is a data flow diagram for processing IMS data in an MP of an electronic device according to an exemplary embodiment of the present invention.

FIG. 24 is a data flow diagram for processing IMS data in an MP of an electronic device according to an exemplary embodiment of the present invention.

Referring to FIG. 24, the MP includes the IMS protocol different from the AP. For example, the MP can include the TCP/IP, the sub SIP (the light SIP), and the RTP/RTCP to process the voice data.

The MP can offer the voice call service over the PS network using the TCP/IP, the RTP/RTCP, and the media engine.

When the service is switched to the video call service, the audio data for the video call service can be processed by the TCP/IP, the RTP/RTCP, and the media engine of the MP. The video data for the video call service can be processed by the TCP/IP and the second IMS protocol stack of the MP and the media engine of the AP. In so doing, the MP can primarily process the video data for the video call service and then send the processed video data to the AP.

As such, when the different processors process the video data and the audio data for the video call service, the AP and the MP exchange the information to synchronize the two data.

According to an exemplary embodiment of the present invention, the AP can process the video data primarily processed by the MP using the media engine.

Alternatively, the AP may process the primarily processed video data received from the MP using the first IMS protocol stack and then play the video data using the media engine.

Figure 25:
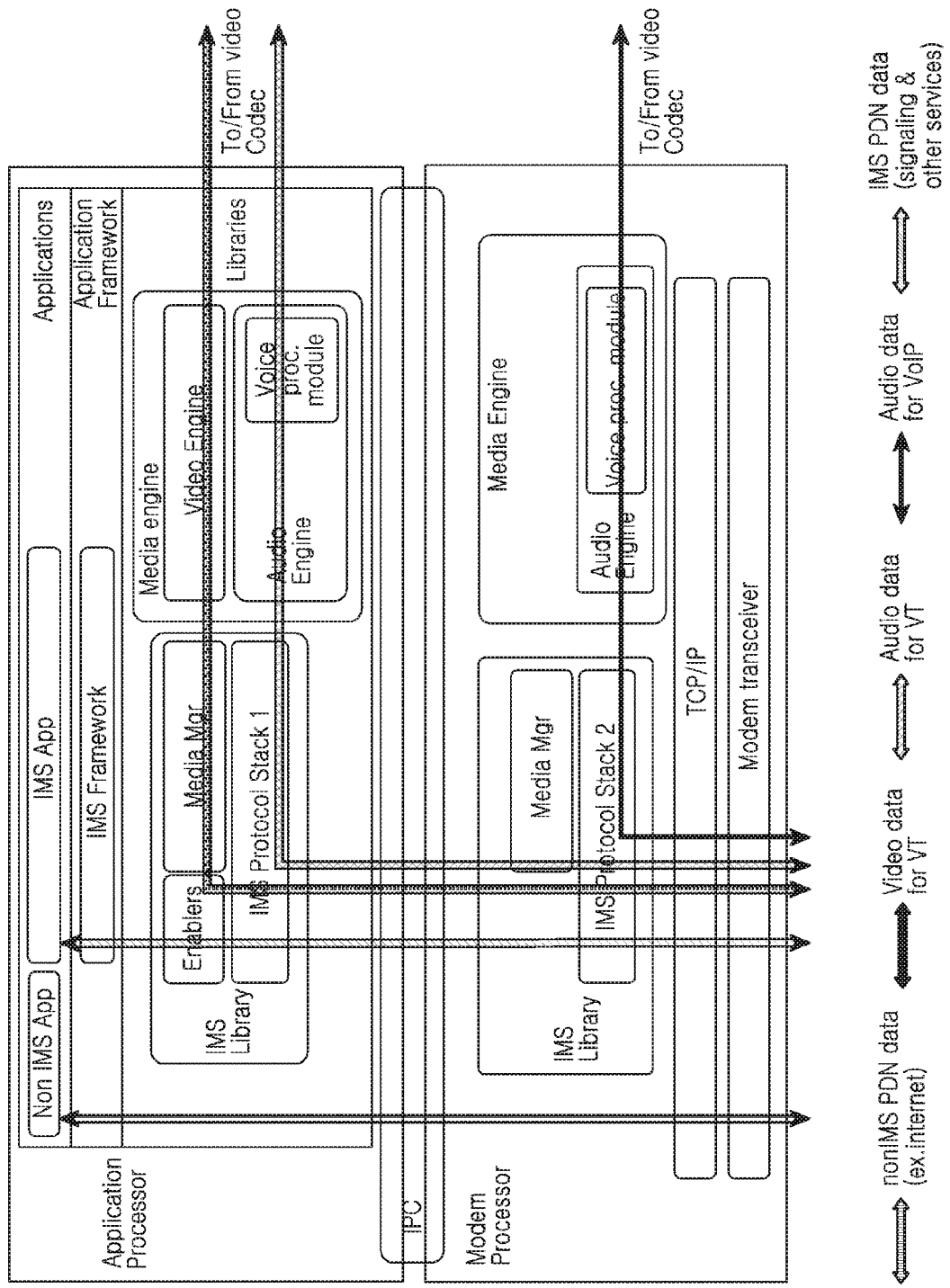
FIG. 25 is a data flow diagram for processing IMS data in an MP of an electronic device according to an exemplary embodiment of the present invention.

FIG. 25 is a data flow diagram for processing IMS data in an MP of an electronic device according to an exemplary embodiment of the present invention.

Referring to FIG. 25, the MP includes the IMS protocol different from the AP. For example, the MP can include the TCP/IP, the sub SIP (the light SIP), and the RTP/RTCP to process the voice call service.

The MP can offer the voice call service over the PS network using the TCP/IP, the RTP/RTCP, and the media engine.

To provide video call service, the MP can primarily process the audio data and the video data for the video call service and then send them to the AP. The AP provides the video call service using the data processed by the MP.

According to an exemplary embodiment of the present invention, the AP can secondarily process the audio data and the video data primarily processed by the MP, using the first IMS protocol stack, and then the audio data and the video data using the media engine.

Alternatively, the AP may play the audio data and the video data primarily processed by the MP, using the media engine.

As set forth above, the MP of the electronic device supports the IMS protocol and provides the IMS service without using the AP. Therefore, the driving time of the AP can be shortened to reduce the power consumption of the AP.

It will be appreciated that exemplary embodiments of the present invention according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present invention.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are exemplary embodiments of machine-readable storage that are suitable for storing a program or programs comprising instructions that, when executed, implement exemplary embodiments of the present invention. Accordingly, exemplary embodiments provide a program comprising code for implementing apparatus or a method as claimed in any one of the claims of this specification and a machine-readable storage storing such a program.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An electronic device comprising:
   a first processor for executing a first internet protocol (IP) multimedia subsystem (IMS) protocol stack; and
   a second processor for executing a second IMS protocol stack,
   wherein the first processor comprises an application processor (AP) for processing a multimedia service,
   wherein the second processor comprises one of a communication processor (CP), a modem processor (MP), or a baseband processor (BP) for processing a cellular communication service,
   wherein when the second processor provides an IMS service associated with voice communication data, a data router included in the second processor transmits the voice communication data to a transmission control protocol (TCP/IP) of the second processor or receives the voice communication data from the TCP/IP of the second processor, and
   wherein when the first processor provides an IMS service associated with multimedia data including video data, the data router transmits the multimedia data to a TCP/IP of the first processor or receives the multimedia data from the TCP/IP of the first processor.

2. The electronic device of claim 1,
   wherein the first processor comprises at least one of a video engine or an audio engine,
   wherein the second processor comprises at least one of a video engine or an audio engine,
   wherein the video engine processes video data provided from the IMS protocol stack, outputs the processed video data, and sends received video data to the IMS protocol stack, and
   wherein the audio engine processes audio data provided from the IMS protocol stack, outputs the processed audio data, and sends received audio data to the IMS protocol stack.

3. The electronic device of claim 1, wherein the first processor and the second processor execute the respective first IMS protocol stack and second IMS protocol stack comprising a plurality of IMS protocols to equally provide the IMS service associated with the voice communication data and the IMS service associated with the multimedia data including the video data.

4. The electronic device of claim 3,
   wherein, if the second processor comprises a video engine and an audio engine, the second processor provides the IMS service associated with the multimedia data including the video data using the plurality of the IMS protocols,
   wherein the video engine processes the video data provided from the second IMS protocol stack, outputs the processed video data, and sends received video data to the second IMS protocol stack,
   wherein the audio engine processes the audio data provided from the second IMS protocol stack, outputs the processed audio data, and sends received audio data to the second IMS protocol stack, and
   wherein, when the second processor provides the IMS service associated with the multimedia data including the video data, the first processor is deactivated.

5. The electronic device of claim 1,
   wherein the first processor executes the first IMS protocol stack comprising a plurality of IMS protocols to provide the IMS service associated with the multimedia data including the video data, and
   wherein the second processor executes the second IMS protocol stack comprising at least one of the IMS protocols of the first IMS protocol stack or the TCP/IP.

6. The electronic device of claim 5, wherein the second IMS protocol stack comprises at least one of a session initiation protocol (SIP), a real-time transfer protocol (RTP) or a real-time control protocol (RTCP).

7. The electronic device of claim 5,
   wherein, if the second processor comprises a video engine and an audio engine, the second processor provides a voice call service and a video call service over a packet switched (PS) network using the at least one IMS protocol,
   wherein the video engine processes video data provided from the second IMS protocol stack, outputs the processed video data, and sends received video data to the second IMS protocol stack,
   wherein the audio engine processes audio data provided from the second IMS protocol stack, outputs the processed audio data, and sends received audio data to the second IMS protocol stack, and
   wherein, when the second processor provides the voice call service or the video call service, the first processor is deactivated.

8. The electronic device of claim 5,
   wherein, if the second processor comprises an audio engine, the second processor provides a voice call service over a packet-switched (PS) network using the second IMS protocol stack, wherein the audio engine processes audio data provided from the second IMS protocol stack, outputs the processed audio data, and sends received audio data to the second IMS protocol stack, and wherein, when the second processor provides the voice call service, the first processor is deactivated.

9. The electronic device of claim 8, wherein the second processor performs session refresh during the voice call service using a session initiation protocol (SIP).

10. The electronic device of claim 9, wherein the second processor comprises:
a first router for selectively sending a SIP signal to a SIP of the second processor or a SIP of the first processor according to a type of the SIP signal.

11. The electronic device of claim 8, wherein the first processor provides the video call service over the PS network by processing video data and audio data received from the second processor through the plurality of the IMS protocols.

12. The electronic device of claim 11, wherein the data router outputs the audio data for the voice call service to the TCP/IP of the second processor, and outputs the video data and the audio data for the video call service to the TCP/IP of the first processor.

13. The electronic device of claim 12, wherein the data router classifies data based on a type of packet data network (PDN) and a bearer.

14. The electronic device of claim 12, wherein the data router classifies the data by analyzing a header of an IP packet.

15. The electronic device of claim 1,
wherein the first processor executes the first IMS protocol stack comprising at least one IMS protocol to provide the IMS service associated with the multimedia data including the video data, and
wherein the second processor comprises the second IMS protocol stack which comprises at least one IMS protocol different from at least one IMS protocol of the first IMS protocol stack.

16. A method for providing an internet protocol (IP) multimedia subsystem (IMS) service in an electronic device comprising a first processor for executing a first IMS protocol stack and a second processor for executing a second IMS protocol stack, the method comprising:
determining whether to provide a communication service; and
when determining to provide the communication service, providing an IMS service associated with voice communication data using the second processor,
wherein the first processor comprises an application processor (AP) for processing a multimedia service,
wherein the second processor comprises one of a communication processor (CP), a modem processor (MP), and a baseband processor (BP) for processing a cellular communication service,
wherein when the second processor provides the IMS service associated with the voice communication data, a data router included in the second processor transmits the voice communication data to a transmission control protocol (TCP/IP) of the second processor or receives the voice communication data from the TCP/IP of the second processor, and
wherein when the first processor provides an IMS service associated with multimedia data including video data, the data router transmits the multimedia data to a TCP/IP of the first processor or receives the multimedia data from the TCP/IP of the first processor.

17. The method of claim 16,
wherein the first processor comprises at least one of a video engine or an audio engine,
wherein the second processor comprises at least one of a video engine or an audio engine,
wherein the video engine processes video data provided from the IMS protocol stack, outputs the processed video data, and sends received video data to the IMS protocol stack, and
wherein the audio engine processes audio data provided from the IMS protocol stack, outputs the processed audio data, and sends received audio data to the IMS protocol stack.

18. The method of claim 16, wherein the first processor and the second processor execute the respective first IMS protocol stack and second IMS protocol stack comprising a plurality of IMS protocols to equally provide the IMS service associated with the voice communication data and the IMS service associated with the multimedia data including the video data.

19. The method of claim 18,
wherein the providing of the IMS service associated with the voice communication data and the IMS service associated with the multimedia data including the video data comprises if the second processor comprises a video engine and an audio engine, providing the IMS service associated with the multimedia data including the video data using the plurality of the IMS protocols,
wherein the video engine processes the video data provided from the IMS protocol stack, outputs the processed video data, and sends received video data to the IMS protocol stack,
wherein the audio engine processes the audio data provided from the IMS protocol stack, outputs the processed audio data, and sends received audio data to the IMS protocol stack, and
wherein, when the second processor provides the IMS service associated with the multimedia data including the video data, the first processor is deactivated.

20. The method of claim 16,
wherein the first processor executes the first IMS protocol stack comprising a plurality of IMS protocols to provide the IMS service associated with the multimedia data including the video data, and
wherein the second processor executes the second IMS protocol stack comprising at least one of the IMS protocols of the first IMS protocol stack.

21. The method of claim 20, wherein the second IMS protocol stack comprises at least one of a session initiation protocol (SIP), a real-time transfer protocol (RTP) or a real-time control protocol (RTCP).

22. The method of claim 20,
wherein the providing of the IMS service associated with the voice communication data and the IMS service associated with the multimedia data including the video data comprises if the second processor comprises a video engine and an audio engine, providing a voice call service or a video call service over a packet switched (PS) network using the at least one IMS protocol,
wherein the video engine processes video data provided from the IMS protocol stack, outputs the processed video data, and sends received video data to the IMS protocol stack, wherein, the audio engine processes audio data provided from the IMS protocol stack, outputs the processed audio data, and sends received audio data to the IMS protocol stack, and wherein, when the second processor provides the voice call service or the video call service, the first processor is deactivated.

23. The method of claim 20, wherein the providing of the IMS service associated with the voice communication data and the IMS service associated with the multimedia data including the video data comprises if the second processor comprises an audio engine, providing a voice call service over a packet switched (PS) network using the at least one IMS protocol stack, wherein the audio engine processes audio data provided from the IMS protocol stack, outputs the processed audio data, and sends received audio data to the IMS protocol stack, and wherein, when the second processor provides the voice call service, the first processor is deactivated.

24. The method of claim 23, further comprising:

when providing the voice call service, performing session refresh using a session initiation protocol (SIP) of the second processor.

25. The method of claim 23, wherein the providing of the IMS service associated with the voice communication data and the IMS service associated with the multimedia data including the video data comprises providing, by the first processor, a video call service over the PS network using the plurality of the IMS protocols.

26. The method of claim 25, further comprising:

before the providing of the video call service in the first processor, determining a type of the data received from a physical layer in the data router of the second processor; and when the data comprises at least one of video data or audio data for the video call service, outputting, at the data router, the data to the TCP/IP of the first processor.

27. The method of claim 26, further comprising:

if the data comprises the audio data for the voice call service, outputting, at the data router, the data to the TCP/IP of the second processor, wherein the providing of the voice call service comprises providing, at the second processor, the voice call service over the PS network using the audio data received from the data router through the TCP/IP.

28. The method of claim 26, wherein the data router determines the data type based on a type of a packet data network (PDN) and a bearer.

29. The method of claim 26, wherein the data router determines the data type by analyzing a header of an IP packet.

30. The method of claim 16, wherein the first processor executes the first IMS protocol stack comprising at least one IMS protocol to provide the IMS service associated with the multimedia data including the video data, and wherein the second processor comprises the second IMS protocol stack which comprises at least one IMS protocol different from at least one IMS protocol of the first IMS protocol stack.

* * * * *